United States Patent
Kwon et al.

(10) Patent No.: US 11,958,998 B2
(45) Date of Patent: *Apr. 16, 2024

(54) COMPOSITIONS, QUANTUM DOT POLYMER COMPOSITES PREPARED THEREFROM, AND DEVICES INCLUDING THE SAME

(71) Applicants: SAMSUNG ELECTRONICS CO., LTD., Suwon-si (KR); Samsung Display Co., Ltd., Yongin-si (KR); SAMSUNG SDI CO., LTD., Yongin-si (KR)

(72) Inventors: Ha Il Kwon, Suwon-si (KR); Tae Gon Kim, Hwaseong-si (KR); Shang Hyeun Park, Yongin-si (KR); Eun Joo Jang, Suwon-si (KR); Shin Ae Jun, Seongnam-si (KR); Garam Park, Seoul (KR)

(73) Assignees: SAMSUNG ELECTRONICS CO., LTD., Gyeonggi-Do (KR); SAMSUNG DISPLAY CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 220 days.

This patent is subject to a terminal disclaimer.

(21) Appl. No.: 17/308,333

(22) Filed: May 5, 2021

(65) Prior Publication Data
US 2021/0284905 A1    Sep. 16, 2021

Related U.S. Application Data

(62) Division of application No. 15/672,608, filed on Aug. 9, 2017, now Pat. No. 11,021,650.

(30) Foreign Application Priority Data

Aug. 9, 2016 (KR) .................. 10-2016-0101492

(51) Int. Cl.
*C09K 11/02* (2006.01)
*C08K 3/16* (2006.01)
(Continued)

(52) U.S. Cl.
CPC ............... *C09K 11/02* (2013.01); *C08K 3/16* (2013.01); *C08K 3/30* (2013.01); *C08K 9/04* (2013.01);
(Continued)

(58) Field of Classification Search
CPC ....... C09K 11/02; C09K 11/025; C09K 11/56; C09K 11/562; C09K 11/565;
(Continued)

(56) References Cited

U.S. PATENT DOCUMENTS 7,166,412 B2   1/2007  Park et al.
7,294,449 B1  11/2007  Gudeman et al.
(Continued)

FOREIGN PATENT DOCUMENTS

CN   101356006 A   1/2009
CN   103059393 A   4/2013
(Continued)

OTHER PUBLICATIONS

Korean Office Action for Korean Patent Application No. 10-2016-0101492 dated Dec. 16, 2022.
(Continued)

*Primary Examiner* — Matthew E. Hoban
*Assistant Examiner* — Lynne Edmondson
(74) *Attorney, Agent, or Firm* — CANTOR COLBURN LLP

(57) ABSTRACT

A composition including a plurality of quantum dots; a binder polymer; a thiol compound having at least two thiol groups; a polyvalent metal compound; a polymerizable
(Continued)

monomer having a carbon-carbon double bond; a photoinitiator; and a solvent.

19 Claims, 16 Drawing Sheets
(2 of 16 Drawing Sheet(s) Filed in Color)

(51) Int. Cl.
| | |
|---|---|
| C08K 3/30 | (2006.01) |
| C08K 5/09 | (2006.01) |
| C08K 5/37 | (2006.01) |
| C08K 9/04 | (2006.01) |
| C09K 11/08 | (2006.01) |
| C09K 11/56 | (2006.01) |
| C09K 11/62 | (2006.01) |
| C09K 11/88 | (2006.01) |
| G02F 1/13357 | (2006.01) |
| H01L 33/50 | (2010.01) |
| G02F 1/1335 | (2006.01) |

(52) U.S. Cl.
CPC .......... *C09K 11/562* (2013.01); *G02F 1/1336* (2013.01); *C08K 2003/168* (2013.01); *C08K 2003/3036* (2013.01); *G02F 1/133614* (2021.01)

(58) Field of Classification Search
CPC ....... C09K 11/623; C09K 11/62; C09K 11/08; C09K 11/06; C09K 11/883; C09K 11/703; C09K 11/54; C09K 11/665; C08K 3/16; C08K 3/30; C08K 3/32; C08K 9/04; C08K 5/09; C08K 5/098; C08K 5/0091; C08K 5/37; C08K 5/39; C08K 2003/168; C08K 2003/3036; G02F 1/1336; G02F 1/133614; H01L 33/502
See application file for complete search history.

(56) References Cited

U.S. PATENT DOCUMENTS

| | | | |
|---|---|---|---|
| 7,341,828 B2 | 3/2008 | Katoh et al. | |
| 7,473,513 B1 | 1/2009 | Park et al. | |
| 7,476,487 B2 | 1/2009 | Park et al. | |
| 7,746,423 B2 | 6/2010 | Im et al. | |
| 7,977,400 B2 | 7/2011 | Taniguchi et al. | |
| 8,071,701 B2 | 12/2011 | Klosin et al. | |
| 8,158,308 B2 | 4/2012 | Murakami et al. | |
| 8,268,519 B2 | 9/2012 | Nakashima et al. | |
| 8,383,753 B2 | 2/2013 | Klosin et al. | |
| 8,847,197 B2 | 9/2014 | Pickett et al. | |
| 8,859,442 B2 | 10/2014 | Naasani et al. | |
| 8,895,319 B2 | 11/2014 | Koo et al. | |
| 8,920,675 B2 | 12/2014 | Xu et al. | |
| 9,082,982 B2 | 7/2015 | Jun et al. | |
| 9,196,682 B2 | 11/2015 | Jang et al. | |
| 9,212,056 B2 | 12/2015 | Breen et al. | |
| 9,373,749 B2 | 6/2016 | Tu et al. | |
| 9,382,470 B2 | 7/2016 | Kang et al. | |
| 9,701,901 B2 | 7/2017 | Kang et al. | |
| 9,778,510 B2 | 10/2017 | Won et al. | |
| 9,904,109 B2 | 2/2018 | Han | |
| 10,001,671 B2 | 6/2018 | Won et al. | |
| 10,108,089 B2 | 10/2018 | Gu et al. | |
| 10,138,390 B2 | 11/2018 | Hozumi | |
| 10,203,599 B2 | 2/2019 | Kim et al. | |
| 10,246,634 B2 | 4/2019 | Yang et al. | |
| 10,533,127 B2 | 1/2020 | Park et al. | |
| 10,676,666 B2 | 6/2020 | Kwon et al. | |
| 10,759,993 B2* | 9/2020 | Yang | G03F 7/2004 |
| 10,983,433 B2* | 4/2021 | Park | G02B 5/223 |
| 10,988,685 B2* | 4/2021 | Ahn | H10K 85/1135 |
| 11,021,650 B2* | 6/2021 | Kwon | G02F 1/1336 |
| 11,186,767 B2* | 11/2021 | Ahn | H10K 85/1135 |
| 2003/0066998 A1 | 4/2003 | Lee | |
| 2008/0070153 A1 | 3/2008 | Ioku et al. | |
| 2009/0017268 A1 | 1/2009 | Skipor et al. | |
| 2010/0069550 A1 | 3/2010 | Gao et al. | |
| 2010/0084629 A1 | 4/2010 | Park et al. | |
| 2011/0017951 A1 | 1/2011 | Ryowa | |
| 2011/0084250 A1 | 4/2011 | Jang et al. | |
| 2011/0223110 A1 | 9/2011 | Bartel | |
| 2011/0260111 A1 | 10/2011 | Nie et al. | |
| 2012/0001217 A1 | 1/2012 | Kang et al. | |
| 2012/0074449 A1 | 3/2012 | Park et al. | |
| 2013/0099213 A1* | 4/2013 | Jun | H10K 85/151 257/E51.026 |
| 2013/0148057 A1 | 6/2013 | Kang et al. | |
| 2014/0024047 A1 | 1/2014 | Kairdolf et al. | |
| 2014/0027711 A1 | 1/2014 | Breen et al. | |
| 2014/0151612 A1 | 6/2014 | Cho et al. | |
| 2014/0353579 A1 | 12/2014 | Greco et al. | |
| 2015/0021551 A1 | 1/2015 | Breen et al. | |
| 2015/0083969 A1 | 3/2015 | Kim et al. | |
| 2015/0098212 A1* | 4/2015 | Won | G02B 6/005 362/97.3 |
| 2015/0183943 A1 | 7/2015 | Mutlugun et al. | |
| 2015/0218444 A1 | 8/2015 | Kang et al. | |
| 2015/0267106 A1 | 9/2015 | Pillay Narrainen et al. | |
| 2015/0284493 A1 | 10/2015 | Mattoussi et al. | |
| 2015/0315460 A1 | 11/2015 | Gim et al. | |
| 2016/0005932 A1 | 1/2016 | Lee et al. | |
| 2016/0011506 A1* | 1/2016 | Gu | G03F 7/029 430/281.1 |
| 2017/0059986 A1 | 3/2017 | Jun et al. | |
| 2017/0082892 A1 | 3/2017 | Chung | |
| 2017/0115562 A1 | 4/2017 | Kim et al. | |
| 2017/0176816 A1 | 6/2017 | Han et al. | |
| 2017/0183565 A1 | 6/2017 | Jun et al. | |
| 2017/0247613 A1 | 8/2017 | Ono | |
| 2017/0306228 A1 | 10/2017 | Kang et al. | |
| 2017/0342316 A1 | 11/2017 | Luther et al. | |
| 2018/0044583 A1 | 2/2018 | Kwon et al. | |
| 2018/0105739 A1 | 4/2018 | Kim et al. | |
| 2018/0142149 A1 | 5/2018 | Youn et al. | |
| 2018/0148638 A1 | 5/2018 | Ahn et al. | |
| 2018/0151817 A1 | 5/2018 | Cho et al. | |
| 2018/0157124 A1 | 6/2018 | Han et al. | |
| 2019/0016952 A1 | 1/2019 | Qiu et al. | |

FOREIGN PATENT DOCUMENTS

| | | |
|---|---|---|
| CN | 103080081 A | 5/2013 |
| CN | 103113882 A | 5/2013 |
| CN | 103497543 A | 1/2014 |
| CN | 103728837 A | 4/2014 |
| CN | 105185918 A | 12/2015 |
| CN | 105985774 A | 10/2016 |
| CN | 104513335 A | 9/2018 |
| EP | 1526584 A2 | 4/2005 |
| EP | 2584623 A2 | 4/2013 |
| EP | 3070756 A1 | 9/2016 |
| EP | 3136174 A1 | 3/2017 |
| EP | 3147708 A1 | 3/2017 |
| EP | 3187564 A1 | 7/2017 |
| EP | 3564750 A1 | 11/2019 |
| JP | 2010209141 A | 9/2010 |
| JP | 2013145364 A | 7/2013 |
| JP | 201493327 A | 5/2014 |
| KR | 10-20100039081 A | 4/2010 |
| KR | 100965373 B1 | 6/2010 |
| KR | 10-201018111 B1 | 2/2011 |
| KR | 1020120028670 A | 3/2012 |
| KR | 1020120050145 A | 5/2012 |
| KR | 101212656 B1 | 12/2012 |
| KR | 20130044071 A | 5/2013 |
| KR | 1020130044071 A | 5/2013 |
| KR | 1020130114436 A | 10/2013 |
| KR | 10-201463416 B1 | 11/2014 |
| KR | 1020150000427 A | 1/2015 |
| KR | 1020150041581 A | 4/2015 |

(56) References Cited

FOREIGN PATENT DOCUMENTS

| KR | 10-201525524 B1 | 5/2015 |
|---|---|---|
| KR | 1020150072089 A | 6/2015 |
| KR | 10-201546938 B1 | 8/2015 |
| KR | 10-20160003503 A | 1/2016 |
| KR | 1020160043666 A | 4/2016 |
| KR | 1020170034055 A | 3/2017 |
| KR | 1020170072418 A | 6/2017 |
| KR | 1020180043748 A | 4/2018 |
| KR | 1020180058208 A | 5/2018 |
| KR | 1020180059724 A | 6/2018 |
| WO | 0017656 A1 | 3/2000 |
| WO | 2009079061 A2 | 6/2009 |
| WO | 2015002565 A1 | 1/2015 |
| WO | 2015100968 A1 | 7/2015 |
| WO | 2016080435 A1 | 5/2016 |
| WO | 2017116820 A1 | 7/2017 |

OTHER PUBLICATIONS

Adis Khetubol, et al., "Triplet Harvesting in Poly(9-vinylcarbazole) and Poly(9-(2,3-epoxypropyl)carbazole) Doped with CdSe/ZnS Quantum Dots Encapsulated with 16-(N-Carbazolyl) Hexadecanoic Acid Ligands", Journal of Polymer Science, Part B: Polymer Phrsics 2014, 52, 539-551.

Bing Bai, et al., "Quaternary CU2ZnSnS4 quantum dot-sensitized solar cells: Synthesis, passivation and ligand exchange", Journal of Power Sources 318 (2016) 35-40.

Cherie R. Kagan, et al., "Charge transport in strongly coupled quantum dot solids", NNano, 2015, 15 pp.

Chih-Hung Chen, et al., "Thiol treatment to enhance photoluminescence and electroluminescence of CdSe/CdS core-shell quantum dots prepared by thermal cycling of single source precursors", RSC Adv. 2015, 5, 9819.

Di Liu et al., "Water-Soluble Semiconductor Nanocrystals Cap Exchanged with Metalated Ligands," DOI: 10.1021/nn1025934, Dec. 8, 2010, pp. 546-550, vol. 5, No. 1, 2011 Amenrical Chemical Society (www.acsnano.org).

Dominik Janczewski, et al., "Synthesis of Functionalzied amphiphilic polymers for coating quantum dots", Nature Protocols, 1546, vol. 6, No. 10, 2011.

Duncan Gregory, et al., "Synthetic Solid State Chemistry", Dalton Transactions, 2010, 4 pp.

English Translation of Office Action dated Jul. 27, 2023 of the corresponding Korean Patent Application No. 10-2016-0105962, 13 pp.

Wenjie Li, et al., "Capping Ligand-Induced Self-Assembly for Quantum Dot Sensitized Solar Cells", J. Phys. Chem. Lett 2015, 6, 796-806.

English Translation of Office Action dated Nov. 4, 2020, of the corresponding Chinese Patent Application No. 201610701845.2.

English Translation of Office Action dated Nov. 4, 2020, of the corresponding Chinese Patent Application No. 201610703071.7.

Evren Mutlugun, et al., "Colloidal Quantum Dot Light-Emitting Diodes Employing Phosphorescent Small Organic Moleculed as Efficient Exciton Harvesters", J. Phys. Chem. Lett 2014, 5, 2802-2807.

Extended European Search Report dated Feb. 1, 2017 of the corresponding European Patent Application No. 161849807.

Extended European Search Report dated Feb. 24, 2017 of the corresponding European Patent Application No. 1618449229.

Extended European Search Report dated Mar. 14, 2019, of the corresponding European Patent Application No. 18204285.3, 9 pp.

Extended European Search Report dated Mar. 2, 2018, of the corresponding European Patent Application No. 17203145.2.

Extended European Search Report dated Mar. 5, 2018, of the corresponding European Patent Application No. 17203152.8.

Xingliang Dai et al., "Solution-processed, high-performance light-emitting diodes based on quantum dots," Nature, Oct. 29, 2014, pp. 96-99, vol. 515.

Hiroji Hosokawa, et al., "Surface modifcations of CdS quantum dots with fluorinated thiophenol", Osaka University, 2014, 6 pp.

Liang Huang, et al., "Organosilane micellization for direct encapsulation of hydrophobic quantum dots into silica beads with highly preserved fluorescence", Chem. Commun., 2012, 48, 6145-6147.

Marcus L. Bohm, et al., "Size and Energy Level Tuning of Quantum Dot Solids ia a Hybrid Ligand Complex", J. Phys. Chem. Lett. 2015, 6, 3510-3514.

Mausam Kalita, et al., "Direct Synthesis of Aqueous Quantum Dots through 4,4'-Bipyridine-Based Twin Ligand Strategy", Inorg. Chem. 2012, 51, 4521-4526.

Office Action dated Jul. 27, 2023 of the corresponding Korean Patent Application No. 10-2016-0105962, 11 pp.

Office Action dated Nov. 4, 2020, of the corresponding Chinese Patent Application No. 201610703071.7.

Office Action dated Mar. 3, 2021, of the corresponding Chinese Patent Application No. 201711176209.3.

Office Action dated Nov. 4, 2020, of the corresponding Chinese Patent Application No. 201610701845.2.

\* cited by examiner

COMPOSITIONS, QUANTUM DOT POLYMER COMPOSITES PREPARED THEREFROM, AND DEVICES INCLUDING THE SAME

CROSS-REFERENCE TO RELATED APPLICATION

This is a divisional application that claims priority to U.S. Application Ser. No. 15/672,608, filed Aug. 9, 2017, which in turn claims priority to Korean Patent Application No. 10-2016-0101492 filed in the Korean Intellectual Property Office on Aug. 9, 2016, and all the benefits accruing therefrom under 35 U.S.C. §§ 119; 120, the contents of which in their entirety are incorporated herein by reference.

BACKGROUND

1. Field

A composition, a quantum dot-polymer composite prepared therefrom, and a device including the same are disclosed.

2. Description of the Related Art

Quantum dots (e.g., nano-sized semiconductor nanocrystals) having different energy bandgaps may be obtained by controlling their sizes and compositions. Such quantum dots may emit light having various wavelengths. In a colloidal synthesis, organic materials such as a dispersing agent or a solvent may coordinate to a surface of the semiconductor during the growth thereof. As a result, quantum dots having a uniformly controlled size and showing desirable luminous properties and stabilities may be prepared.

However, due to their nano-size, the luminous properties and stabilities of the quantum dots are susceptible to external environment. Thus, the quantum dots are mixed with (e.g., dispersed in) a solid state matrix (e.g., a polymer matrix) to form a quantum dot polymer composite, which is then applied to various electronic devices such as different display devices and lighting devices. Preparation processes of such composites (e.g., a heat-treating process) may have substantial and adverse effects on their luminous properties. Thus, there remains a need to develop a technique for preparing a quantum dot polymer composite without causing deterioration of inherent properties of the quantum dots.

SUMMARY

An embodiment is related to a composition for preparing a quantum dot polymer composite capable of achieving improved process stability and to a quantum dot polymer composite prepared therefrom.

Another embodiment provides an electronic device including the quantum dot-polymer composite.

In an embodiment, a photosensitive composition includes:
a quantum dot (e.g., a plurality of quantum dots) having an organic ligand on a surface thereof;
a binder polymer;
a thiol compound having at least two thiol groups;
a polyvalent metal compound;
a polymerizable monomer having a carbon-carbon double bond;
a photoinitiator; and
a solvent,
wherein the binder polymer includes
a copolymer of a monomer combination including a first monomer having a carboxylic acid group and a carbon-carbon double bond, a second monomer having a carbon-carbon double bond and a hydrophobic moiety and not having a carboxylic acid group, and optionally, a third monomer having a carbon-carbon double bond and a hydrophilic moiety and not having a carboxylic acid group;
a multiple aromatic ring-containing polymer including a carboxylic acid group (—COOH) and a main chain including a backbone structure incorporated in the main chain, wherein the backbone structure includes a quaternary carbon atom, which is a part of a cyclic group, and two aromatic rings bound to the quaternary carbon atom; or
a combination thereof, and
wherein the thiol compound binds at least two quantum dots of the plurality of quantum dots to each other.

The plurality of the quantum dots may be dispersed in the binder polymer. Therefore, the composition includes a quantum dot dispersion including the binder polymer and a quantum dot dispersed in the binder.

The organic ligand may include RCOOH, $RNH_2$, $R_2NH$, $R_3N$, RSH, $R_3PO$, $R_3P$, ROH, RCOOR', $RPO(OH)_2$, $R_2POOH$ (wherein R and R' are independently a C5 to C24 substituted or unsubstituted aliphatic hydrocarbon group or a C5 to C20 substituted or unsubstituted aromatic hydrocarbon group), a polymeric organic ligand, or a combination thereof.

The quantum dot may include a Group II-VI compound, a Group III-V compound, a Group IV-VI compound, a Group IV element or compound, a Group compound, a Group II-II-IV-VI compound, or a combination thereof.

The carboxylic acid group-containing polymer may have an acid value of greater than or equal to about 50 milligrams of KOH per gram of the polymer.

The carboxylic acid group-containing polymer may have an acid value of less than or equal to about 250 milligrams of KOH per gram of the polymer.

The carboxylic acid group-containing polymer may have an acid value between about 120 milligrams of KOH per gram of the polymer and 200 milligrams of KOH per gram of the polymer.

The quantum dot may include an organic ligand bound to a surface thereof.

The copolymer may include a first repeating unit derived from the first monomer and a second repeating unit derived from the second monomer, and
the first repeating unit may include a unit represented by Chemical Formula 1-1, a unit represented by Chemical Formula 1-2, or a combination thereof:

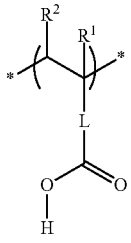

Chemical Formula 1-1 wherein
R¹ is hydrogen, a C1 to C3 alkyl group, or —(CH$_2$)$_n$—COON (wherein n is 0 to 2),
R² is hydrogen, a C1 to C3 alkyl group, or —COOH,
L is a single bond, a C1 to C15 aliphatic hydrocarbon group, a C6 to C30 aromatic hydrocarbon group, a C3 to C30 alicyclic hydrocarbon group, or a C1 to C15 aliphatic hydrocarbon group substituted with a C6 to C30 aromatic hydrocarbon group or a C3 to C30 alicyclic hydrocarbon group, and
* indicates a portion linked to an adjacent atom;

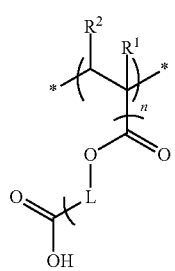

Chemical Formula 1-2 wherein
R¹ is hydrogen, a C1 to C3 alkyl group, or —(CH$_2$)$_{n1}$—COON (wherein n1 is 0 to 2),
R² is hydrogen or a C1 to C3 alkyl group,
L is a C1 to C15 alkylene group, a C1 to C15 alkylene group wherein at least one methylene group is substituted with —C(=O)—, —O—, or —C(=O)O—, a C6 to C30 aromatic hydrocarbon group, a C3 to C30 alicyclic hydrocarbon group, or a C1 to C15 aliphatic hydrocarbon group substituted with a C6 to C30 aromatic hydrocarbon group or a C3 to C30 alicyclic hydrocarbon group,
n is an integer of 1 to 3, and
* indicates a portion linked to an adjacent atom.

The second repeating unit may include a unit represented by Chemical Formula 2-1, a unit represented by Chemical Formula 2-2, a unit represented by Chemical Formula 2-3, a unit represented by Chemical Formula 2-4, or a combination thereof:

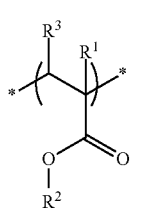

Chemical Formula 2-1 wherein
R¹ is hydrogen or a C1 to C3 alkyl group,
R² is a C1 to C15 aliphatic hydrocarbon group, a C6 to C30 aromatic hydrocarbon group, a C3 to C30 alicyclic hydrocarbon group, or a C1 to C15 aliphatic hydrocarbon group substituted with a C6 to C30 aromatic hydrocarbon group or a C3 to C30 alicyclic hydrocarbon group,
R³ is hydrogen or a C1 to C3 alkyl group, and
* indicates a portion linked to an adjacent atom;

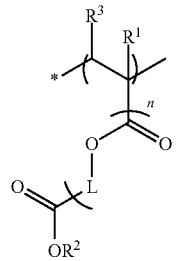

Chemical Formula 2-2 wherein
R¹ is hydrogen or a C1 to C3 alkyl group,
L is a C1 to C15 alkylene group, a C1 to C15 alkylene group wherein at least one methylene group is substituted with —C(=O)—, —O—, or —C(=O)O—, a C6 to C30 aromatic hydrocarbon group, a C3 to C30 alicyclic hydrocarbon group, or a C1 to C15 aliphatic hydrocarbon group substituted with a C6 to C30 aromatic hydrocarbon group or a C3 to C30 alicyclic hydrocarbon group,
R² is a C1 to C15 aliphatic hydrocarbon group, a C6 to C30 aromatic hydrocarbon group, a C3 to C30 alicyclic hydrocarbon group, or a C1 to C15 aliphatic hydrocarbon group substituted with a C6 to C30 aromatic hydrocarbon group or a C3 to C30 alicyclic hydrocarbon group,
R³ is hydrogen or a C1 to C3 alkyl group,
n is an integer of 1 to 3, and
* indicates a portion linked to an adjacent atom;

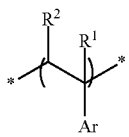

Chemical Formula 2-3 wherein
each of R¹ and R² is independently hydrogen or a C1 to C3 alkyl group,
Ar is a substituted or unsubstituted C6 to C30 aromatic hydrocarbon group or a substituted or unsubstituted C3 to C30 alicyclic hydrocarbon group, and
* indicates a portion linked to an adjacent atom;

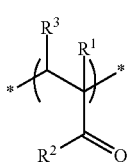

Chemical Formula 2-4 wherein

R$^1$ is hydrogen or a C1 to C3 alkyl group,

R$^2$ is a C1 to C15 aliphatic hydrocarbon group, a C6 to C30 aromatic hydrocarbon group, a C3 to C30 alicyclic hydrocarbon group, or a C1 to C15 aliphatic hydrocarbon group substituted with a C6 to C30 aromatic hydrocarbon group or a C3 to C30 alicyclic hydrocarbon group, R$^3$ is hydrogen or a C1 to C3 alkyl group, and

* indicates a portion linked to an adjacent atom.

The copolymer may include a third repeating unit derived from the third monomer and represented by Chemical Formula 3:

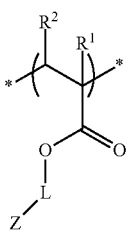

Chemical Formula 3 wherein each of R$^1$ and R$^2$ is independently hydrogen or a C1 to C3 alkyl group, L is a C1 to C15 alkylene group, a C1 to C15 alkylene group wherein at least one methylene group is substituted with —C(=O)—, —O—, or —C(=O)O—, a C6 to C30 aromatic hydrocarbon group, a C3 to C30 alicyclic hydrocarbon group, or a C1 to C15 aliphatic hydrocarbon group substituted with a C6 to C30 aromatic hydrocarbon group or a C3 to C30 alicyclic hydrocarbon group, Z is a hydroxyl group (—OH), a mercapto group (—SH), or an amino group (—NHR, wherein R is hydrogen or a C1 to C5 alkyl group), and

* indicates a portion linked to an adjacent atom.

In the copolymer, the first monomer may include acrylic acid, methacrylic acid, or a combination thereof, the second monomer may include an arylalkyl(meth)acrylate, styrene, or a combination thereof, and the third monomer may include a hydroxyalkyl (meth)acrylate.

In the copolymer, an amount of the first repeating unit may be greater than or equal to about 5 mole percent and less than or equal to about 95 mole percent.

In the multiple aromatic ring-containing polymer, the backbone structure may include a unit represented by Chemical Formula B:

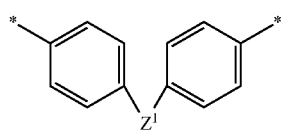

Chemical Formula B wherein

* indicates a portion that is linked to an adjacent atom of the main chain of the binder, Z$^1$ is a linking moiety represented by any one of Chemical Formulae B-1 to B-6, and in Chemical Formulae B-1 to B-6, * indicates a portion that is linked to an adjacent atom:

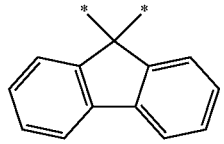

Chemical Formula B-1

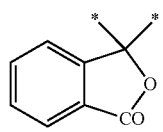

Chemical Formula B-2

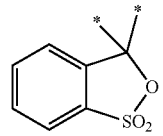

Chemical Formula B-3

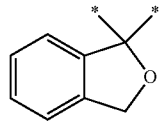

Chemical Formula B-4

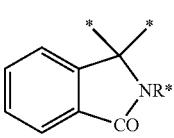

Chemical Formula B-5 wherein R$^a$ is hydrogen, an ethyl group, C$_2$H$_4$Cl, C$_2$H$_4$OH, CH$_2$CH=CH$_2$, or a phenyl group,

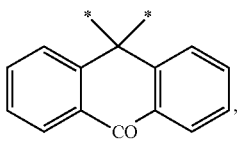

Chemical Formula B-6 wherein in Chemical Formula B-1 to B-6, * indicates a portion that is linked to an adjacent atom of the main chain of the binder.

The multiple aromatic ring-containing polymer may include a unit represented by Chemical Formula C:

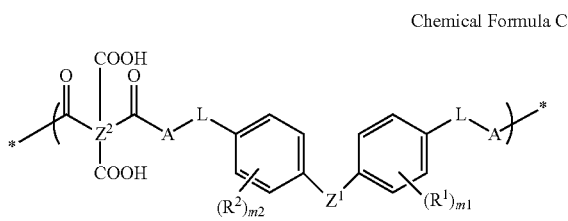

Chemical Formula C wherein

Z$^1$ is a linking moiety represented by any one of the above Chemical Formulae B-1 to B-6, L is the same or different and each independently a single bond, a C1 to C10 alkylene, a C1 to C10 alkylene having a substituent including a carbon-carbon double bond, a C1 to C10 oxy alkylene, or a C1 to C10 oxy alkylene having a substituent including a carbon-carbon double bond, A is —NH—, —O—, or a C1 to C10 alkylene, $Z^2$ is a C6 to C40 aromatic organic group, group, or a C3 to C20 alicyclic hydrocarbon group), —C(CF$_3$)$_2$—, —C(CF$_3$)(C$_6$H$_5$)—, or —C(=O)NH—.

The multiple aromatic ring-containing polymer may include a structural unit represented by Chemical Formula D:

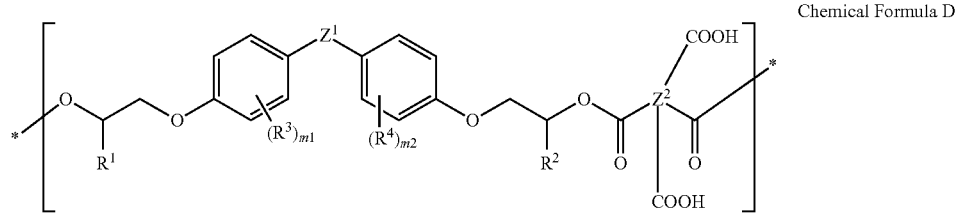

Chemical Formula D each of $R^1$ and $R^2$ is independently hydrogen, a halogen, or a substituted or unsubstituted C1 to C20 alkyl group, m1 and m2 are independently an integer ranging from 0 to 4, and each of * and *' indicate a portion that is linked to an adjacent atom.

In Chemical Formula C, $Z^2$ may be any one of Chemical Formula C-1, Chemical Formula C-2, and Chemical Formula C-3:

Chemical Formula C-1 wherein * indicates a portion that is linked to an adjacent carbonyl carbon,

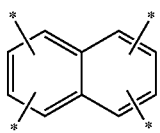

Chemical Formula C-2 wherein * indicates a portion that is linked to an adjacent carbonyl carbon,

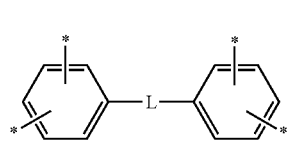

Chemical Formula C-3 wherein * indicates a portion that is linked to an adjacent carbonyl carbon,

L is a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —CR$_2$— (wherein R is independently hydrogen, a C1 to 010 aliphatic hydrocarbon group, a C6 to C20 aromatic hydrocarbon wherein each of $R^1$ and $R^2$ is independently hydrogen or a substituted or unsubstituted (meth)acryloyloxyalkyl group, each of $R^3$ and $R^4$ is independently hydrogen, a halogen, or a substituted or unsubstituted C1 to C20 alkyl group, $Z^1$ is a moiety selected from linking moieties represented by Chemical Formulae B-1 to B-6, $Z^2$ is an aromatic organic group such as the moieties set forth above, m1 and m2 are independently an integer ranging from 0 to 4, and

* indicates a portion that is linked to an adjacent atom.

A weight average molecular weight of the binder polymer may be greater than or equal to about 1,000 grams per mole and less than or equal to about 100,000 grams per mole.

The thiol compound may be represented by Chemical Formula 4:

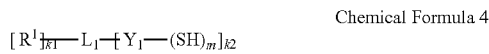

Chemical Formula 4 wherein, $R^1$ is hydrogen, a substituted or unsubstituted C1 to C30 linear or branched alkyl group, a substituted or unsubstituted C6 to C30 aryl group, a substituted or unsubstituted C7 to C30 arylalkyl group, a substituted or unsubstituted C3 to C30 heteroaryl group, a substituted or unsubstituted C4 to C30 heteroarylalkyl group, a substituted or unsubstituted C3 to C30 cycloalkyl group, a substituted or unsubstituted C3 to C30 heterocycloalkyl group, a C1 to C10 alkoxy group, a hydroxy group, —NH$_2$, a substituted or unsubstituted C1 to C30 amine group (—NRR', wherein R and R' are independently hydrogen or a C1 to C30 linear or branched alkyl group), an isocyanate group, a halogen, —ROR' (wherein R is a substituted or unsubstituted C1 to C20 alkylene group and R' is hydrogen or a C1 to C20 linear or branched alkyl group), an acyl halide (—RC(=O)X, wherein R is a substituted or unsubstituted C1 to C20 alkylene group and X is a halogen), —C(=O)OR' (wherein R' is hydrogen or a C1 to C20 linear or branched alkyl group), —CN, —C(=O)NRR' (wherein R and R' are independently hydrogen or a C1 to C20 linear or branched alkyl group), —C(=O)ONRR' (wherein R and R' are independently hydrogen or a C1 to C20 linear or branched alkyl group) or a combination thereof, $L_1$ is a carbon atom, a substituted or unsubstituted C1 to C30 alkylene group, a substituted or unsubstituted C6 to C30 cycloalkylene group, a substituted or unsubstituted C6 to C30 arylene group, a substituted or unsubstituted C3 to C30 heteroarylene group, or a substituted or unsubstituted C3 to C30 heterocycloalkylene group, wherein at least one methylene (—CH$_2$—) of the substituted or unsubstituted C1 to C30 alkylene group may be replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 alkyl group), or a combination thereof, Y$_1$ is a single bond, a substituted or unsubstituted C1 to C30 alkylene group, a substituted or unsubstituted C2 to C30 alkenylene group, or a C1 to C30 alkylene group or a C2 to C30 alkenylene group wherein at least one methylene (—CH$_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—NR—) (wherein R is hydrogen or a C1 to C10 linear or branched alkyl group), or a combination thereof, m is an integer of 1 or more, k1 is 0 or an integer of 1 or more, k2 is an integer of 1 or more, and the sum of m and k2 is an integer of 3 or more, provided that m does not exceed the valence of Y$_1$ when Y$_1$ is not a single bond, and provided that the sum of k1 and k2 does not exceed the valence of Li.

The thiol compound may include a compound of Chemical Formula 4-1:

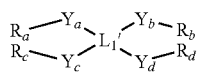

Chemical Formula 4-1 wherein

L$_4$' is carbon, a substituted or unsubstituted C2 to C20 group derived from an alkane, a substituted or unsubstituted C6 to C30 group derived from an arene, a substituted or unsubstituted C3 to C30 group derived from a heteroarene, a substituted or unsubstituted C3 to C30 group derived from a cycloalkane, or a substituted or unsubstituted C3 to C30 group derived from a heterocycloalkane, each of Y$_a$ to Y$_d$ is independently a single bond, a substituted or unsubstituted C1 to C30 alkylene group, a substituted or unsubstituted C2 to C30 alkenylene group, or a C1 to C30 alkylene group or a C2 to C30 alkenylene group wherein at least one methylene (—CH$_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—NR—) (wherein R is hydrogen or a C1 to C10 linear or branched alkyl group), or a combination thereof, and each of R$_a$ to R$_d$ is R$^1$ of Chemical Formula 4 or SH, provided that at least two of R$_a$ to R$_d$ are SH.

The thiol compound may include ethoxylated pentaerythritol tetra(3-mercaptopropionate), tri methylol propane tri (3-mercaptopropionate), trimethylolpropane-tri(2-mercaptoacetate), glycol di-3-mercaptopropionate, polypropylene glycol di(3-mercaptopropionate), ethoxylated trimethylolpropane tri(3-mercaptopropionate), glycol dimercaptoacetate, ethoxylated glycol dimercaptoacetate, 1,4-bis(3-mercaptobutyryloxy)butane, trimethylolpropane tris(3-mercaptopropionate), tris[2-(3-mercaptopropionyloxy) ethyl]isocyanurate, 1,3,5-tris(3-mercaptobutyloxyethyl)-1,3,5-triazine-2,4,6(1H,3H,5H)-trione, pentaerythritol tetrakis (3-mercaptopropionate), pentaerythritol tetrakis(2-mercaptoacetate), 1,6-hexanedithiol, 1,3-propanedithiol, 1,2-ethanedithiol, a polyethylene glycol dithiol including 1 to 10 ethylene glycol repeating units, or a combination thereof.

The polyvalent metal compound may include a metal selected from Mg, Ca, Sc, Ti, V, Cr, Mn, Fe, Co, Ni, Cu, Zn, Ga, Sr, Y, Zr, Nb, Mo, Cd, In, Ba, Au, Hg, Tl, and a combination thereof.

The polyvalent metal compound may include organic metal compound, an organic salt, an inorganic salt, or a combination thereof.

The polyvalent metal compound may include a metal chloride, an alkylated metal, a metal acetate, a metal (meth)acrylate, a metal dialkyldithiocarbamate, or a combination thereof.

The photopolymerizable monomer including a carbon-carbon double bond may include alkyl (meth)acrylate, ethylene glycol di(meth)acrylate, triethylene glycol di(meth)acrylate, diethylene glycol di(meth)acrylate, 1,4-butanediol di(meth)acrylate, 1,6-hexanediol di(meth)acrylate, neopentyl glycol di(meth)acrylate, pentaerythritol di(meth)acrylate, pentaerythritol tri(meth)acrylate, pentaerythritol tetra(meth)acrylate, dipentaerythritol di(meth)acrylate, dipentaerythritol tri(meth)acrylate, dipentaerythritol penta(meth)acrylate, dipentaerythritol hexa(meth)acrylate, bisphenol A epoxyacrylate, bisphenol A di(meth)acrylate, trimethylolpropane tri(meth)acrylate, ethylene glycol monomethyl ether (meth)acrylate, novolac epoxy (meth)acrylate, diethylene glycol di(meth)acrylate, triethylene glycol di(meth)acrylate, propylene glycol di(meth)acrylate, tris(meth)acryloyloxyethyl phosphate, or a combination thereof.

The composition may include:

about 1 weight percent to about 60 weight percent of the quantum dots;

about 0.5 weight percent to about 60 weight percent of the binder polymer;

about 0.1 weight percent to about 50 weight percent of the thiol compound;

about 0.01 weight percent to about 5 weight percent of the polyvalent metal compound;

about 0.5 weight percent to about 70 weight percent of the photopolymerizable monomer;

about 0.01 weight percent to about 10 weight percent of the photoinitiator; and a balance amount of the solvent, based on the total weight of the composition.

In another embodiment, a quantum dot-polymer composite includes:

a polymer matrix including a binder polymer having a carboxylate moiety (—COO$^-$) and carboxylic acid (—COON) moiety, a polymerization product, a moiety derived from a thiol, and a polyvalent metal compound; and a plurality of quantum dots dispersed in the polymer matrix;

wherein the quantum dot includes an organic ligand on a surface thereof, wherein the binder polymer includes a copolymer of a monomer combination including a first monomer having a carboxylic acid group and a carbon-carbon double bond, a second monomer having a carbon-carbon double bond and a hydrophobic moiety and not having a carboxylic acid group, and optionally, a third monomer having a carbon-carbon double bond and a hydrophilic moiety and not having a carboxylic acid group;
a multiple aromatic ring-containing polymer including a carboxylic acid group (—COON) and a main chain including a backbone structure incorporated in the main chain, wherein the backbone structure includes a quaternary carbon atom, which is a part of a cyclic group, and two aromatic rings bound to the quaternary carbon atom; or
a combination thereof, and
wherein the polymerization product includes a polymerization product of a photopolymerizable monomer having a carbon-carbon double bond, a polymerization product of a thiol compound having at least two thiol groups at its terminal ends and the photopolymerizable monomer, or a combination thereof, and
wherein the polymer matrix includes an ionic crosslinking bond between the carboxylate moiety and a metal ion of the polyvalent metal compound.

In the composite, the moiety derived from the thiol binds at least two quantum dots of the plurality of quantum dots to each other.

The plurality of quantum dots may be dispersed (e.g., separated from one another) in the matrix (e.g., without agglomeration).

The copolymer may be a linear polymer. The photopolymerizable monomer may include a monomer having at least three (meth)acrylate groups and the polymerization product may include a crosslinked polymer.

The organic ligand may include a hydrophobic moiety and it may include RCOOH, RNH$_2$, R$_2$NH, R$_3$N, RSH, R$_3$PO, R$_3$P, ROH, RCOOR', RPO(OH)$_2$, R$_2$POOH (wherein R and R' are independently a substituted or unsubstituted C5 to C24 aliphatic hydrocarbon group or a substituted or unsubstituted C5 to C20 aromatic hydrocarbon group), a polymeric organic ligand, or a combination thereof.

The quantum dot may include a Group II-VI compound, a Group III-V compound, a Group IV-VI compound, a Group IV element or compound, a Group compound, a Group I-II-IV-VI compound, or a combination thereof.

The carboxylic acid group-containing polymer may have an acid value of greater than or equal to about 50 milligrams of KOH per gram of the polymer.

The carboxylic acid group-containing polymer may have an acid value of less than or equal to about 250 milligrams of KOH per gram of the polymer.

The photopolymerizable monomer includes an acryl monomer having at least one acryl moiety and the thiol compound may be represented by Chemical Formula 4:

Chemical Formula 4

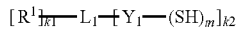

wherein,
R$^1$ is hydrogen, a substituted or unsubstituted C1 to C30 linear or branched alkyl group, a substituted or unsubstituted C6 to C30 aryl group, a substituted or unsubstituted C7 to C30 arylalkyl group, a substituted or unsubstituted C3 to C30 heteroaryl group, a substituted or unsubstituted C4 to C30 heteroarylalkyl group, a substituted or unsubstituted C3 to C30 cycloalkyl group, a substituted or unsubstituted C3 to C30 heterocycloalkyl group, a C1 to C10 alkoxy group, a hydroxy group, —NH$_2$, a substituted or unsubstituted C1 to C30 amine group (—NRR', wherein R and R' are independently hydrogen or a C1 to C30 linear or branched alkyl group), an isocyanate group, a halogen, —ROR' (wherein R is a substituted or unsubstituted C1 to C20 alkylene group and R' is hydrogen or a C1 to C20 linear or branched alkyl group), an acyl halide (—RC(=O)X, wherein R is a substituted or unsubstituted C1 to C20 alkylene group and X is a halogen), —C(=O)OR' (wherein R' is hydrogen or a C1 to C20 linear or branched alkyl group), —CN, —C(=O)NRR' (wherein R and R' are independently hydrogen or a C1 to C20 linear or branched alkyl group), —C(=O)ONRR' (wherein R and R' are independently hydrogen or a C1 to C20 linear or branched alkyl group) or a combination thereof, L$_1$ is a carbon atom, a substituted or unsubstituted C1 to C30 alkylene group, a substituted or unsubstituted C6 to C30 cycloalkylene group, a substituted or unsubstituted C6 to C30 arylene group, a substituted or unsubstituted C3 to C30 heteroarylene group, or a substituted or unsubstituted C3 to C30 heterocycloalkylene group, wherein at least one methylene (—CH$_2$—) of the substituted or unsubstituted C1 to C30 alkylene group may be replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 alkyl group), or a combination thereof, Y$_1$ is a single bond, a substituted or unsubstituted C1 to C30 alkylene group, a substituted or unsubstituted C2 to C30 alkenylene group, or a C1 to C30 alkylene group or a C2 to C30 alkenylene group wherein at least one methylene (—CH$_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—NR—) (wherein R is hydrogen or a C1 to C10 linear or branched alkyl group), or a combination thereof, m is an integer of 1 or more,
k1 is 0 or an integer of 1 or more, k2 is an integer of 1 or more, and
the sum of m and k2 is an integer of 3 or more,
provided that m does not exceed the valence of Y$_1$ when Y$_1$ is not a single bond, and
provided that the sum of k1 and k2 does not exceed the valence of L$_1$.

The quantum dot polymer composite may further include a light diffusing agent selected from a metal oxide particle, a metal particle, and a combination thereof.

The metal ion may include a metal ion selected from Mg$^{2+}$, Ca$^{2+}$, SC$^{3+}$, Ti$^{4+}$, V$^{5+}$, Cr$^{3+}$, Mn$^{2+}$, Fe$^{2+}$, Co$^{2+}$, Ni$^{2+}$, Cu$^{2+}$, Zn$^{2+}$, Ga$^{3+}$, Sr$^{2+}$, Y$^{3+}$, Zr$^{4+}$, Nb$^{5+}$, Mo$^{4+}$, Cd$^{2+}$, In$^{3+}$, Ba$^{2+}$, Au$^{3+}$, Hg$^{2+}$, Tl$^{3+}$, and a combination thereof.

The polyvalent metal compound may include a metal chloride, an alkylated metal, a metal acetate, a metal (meth) acrylate, a metal dialkyldithiocarbamate, or a combination thereof.

The composite may include, based on the total weight of the composite:
about 1 weight percent to about 70 weight percent of the quantum dots;
about 0.5 weight percent to about 70 weight percent of the binder polymer;
about 0.5 weight percent to about 75 weight percent of the photopolymerizable monomer;
about 0.1 weight percent to about 55 weight percent of the moiety derived from the thiol; and
about 0.01 weight percent to about 10 weight percent of the polyvalent metal compound.

The quantum dot polymer composite may have an absolute quantum yield of greater than or equal to about 60%.

Another embodiment provides an electronic device including the aforementioned quantum dot-polymer composite.

The electronic devices may include a light emitting diode, an organic light emitting diode, a sensor, an imaging sensor, a solar cell device, or a liquid crystal display device.

The composition of the foregoing embodiments may prepare a quantum dot polymer composite (e.g., a film or a coating) that may show improved heat stability. The composites of the foregoing embodiments may find their utility in various devices such as different display devices (e.g., having a photoluminescent color filter), a lighting device, and the like.

BRIEF DESCRIPTION OF THE DRAWINGS

The present patent application contains at least one drawing executed in color. Copies of this application with color drawing(s) will be provided by the Office upon request and payment of the necessary fee.

These and/or other aspects will become apparent and more readily appreciated from the following description of the embodiments, taken in conjunction with the accompanying drawings in which.

DETAILED DESCRIPTION

Figure 1:
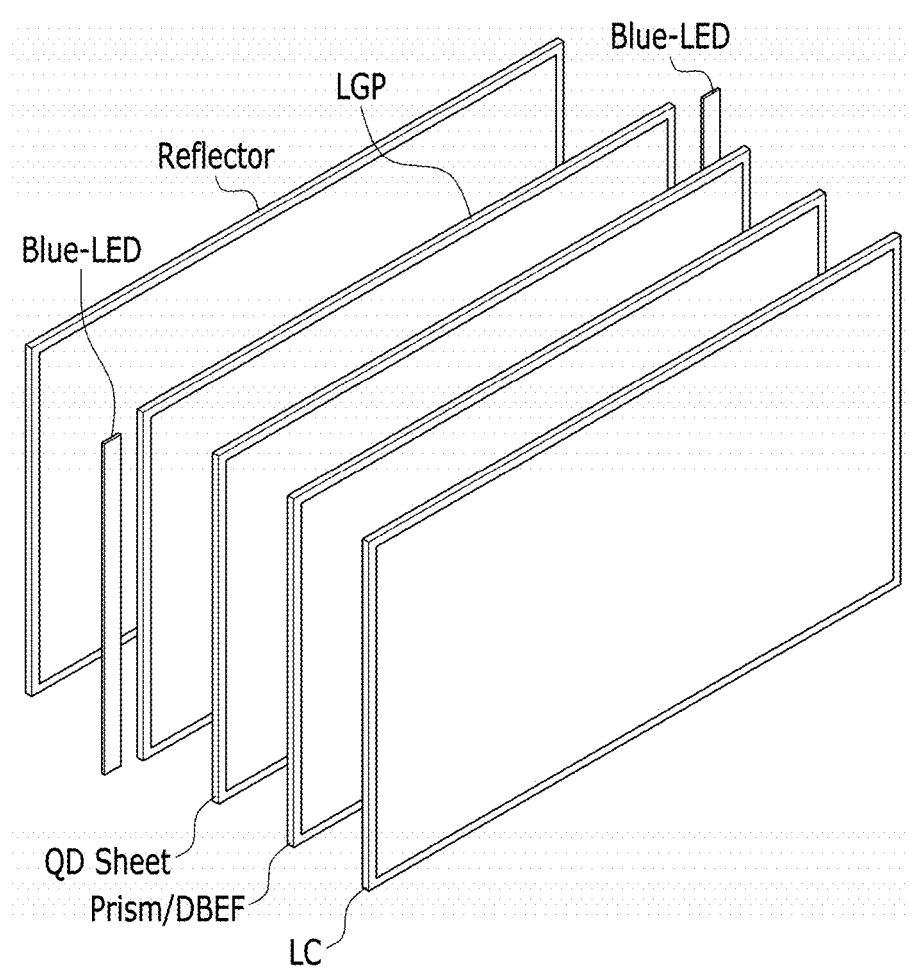
FIG. 1 is an exploded view of an electronic device, according to an embodiment.

Advantages and characteristics of this disclosure, and a method for achieving the same, will become evident referring to the following exemplary embodiments together with the drawings attached hereto. The embodiments, may, however, be embodied in many different forms and should not be construed as being limited to the embodiments set forth herein. Accordingly, the exemplary embodiments are merely described below, by referring to the figures, to explain aspects of the present inventive concept. Expressions such as "at least one of," when preceding a list of elements, modify the entire list of elements and do not modify the individual elements of the list. If not defined otherwise, all terms (including technical and scientific terms) in the specification may be defined as commonly understood by one skilled in the art. The terms defined in a generally-used dictionary should be interpreted as having a meaning that is consistent with their meaning in the context of the relevant art and the present disclosure, and may not be interpreted ideally or overly broad unless clearly defined. In addition, unless explicitly described to the contrary, the word "comprise" and variations such as "comprises" or "comprising", and the word "include" and variations such as "includes" or "including", when used in this specification, specify the presence of stated features, regions, integers, steps, operations, elements, and/or components, but do not preclude the presence or addition of one or more other features, regions, integers, steps, operations, elements, components, and/or groups thereof. Therefore, the above words will be understood to imply the inclusion of stated elements but not the exclusion of any other elements.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±10%, 5% of the stated value.

Exemplary embodiments are described herein with reference to cross section illustrations that are schematic illustrations of idealized embodiments.

As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Further, the singular includes the plural unless mentioned otherwise. In the drawings, the thickness of layers, films, panels, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, when a definition is not otherwise provided, the term "substituted" refers to a compound or a group or a moiety wherein at least one of hydrogen atoms thereof is substituted with a substituent selected from a C1 to C30 alkyl group, a C2 to C30 alkynyl group, a C6 to C30 aryl group, a C7 to C30 alkylaryl group, a C1 to C30 alkoxy group, a C1 to C30 heteroalkyl group, a C3 to C30 heteroalkylaryl group, a C3 to C30 cycloalkyl group, a C3 to C30 cycloalkenyl group, a C3 to C30 cycloalkynyl group, a C2 to C30 heterocycloalkyl group, a halogen (—F, —Cl, —Br, or —I), a hydroxy group (—OH), a nitro group (—NO$_2$), a cyano group (—CN), an amino group (—NRR', wherein R and R' are independently hydrogen or a C1 to C6 alkyl group), an azido group (—N$_3$), an amidino group (—C(=NH)NH$_2$), a hydrazino group (—NHNH$_2$), a hydrazono group (=N(NH$_2$), an aldehyde group (—C(=OH), a carbamoyl group (—C(O)NH$_2$), a thiol group (—SH), an ester group (—C(=O)OR, wherein R is a C1 to C6 alkyl group or a C6 to C12 aryl group), a carboxylic acid group (—COOH) or a salt thereof (—C(=O)OM, wherein M is an organic or inorganic cation), a sulfonic acid group (—SO$_3$H) or a salt thereof (—SO$_3$M, wherein M is an organic or inorganic cation), a phosphoric acid group (—Po$_3$H$_2$) or a salt thereof (—PO$_3$MH or —PO$_3$M$_2$, wherein M is an organic or inorganic cation), and a combination thereof.

As used herein, the term "monovalent organic functional group" refers to a C1 to C30 alkyl group, a C2 to C30 alkenyl group, a C2 to C30 alkynyl group, a C6 to C30 aryl group, a C7 to C30 alkylaryl group, a C1 to C30 alkoxy group, a C1 to C30 heteroalkyl group, a C3 to C30 heteroalkylaryl group, a C3 to C30 cycloalkyl group, a C3 to C30 cycloalkenyl group, a C3 to C30 cycloalkynyl group, or a C2 to C30 heterocycloalkyl group.

As used herein, when a definition is not otherwise provided, the term "alkyl group" refers to a group derived from a straight or branched chain saturated aliphatic hydrocarbon having the specified number of carbon atoms and having a valence of at least one.

As used herein, when a definition is not otherwise provided, the term "alkoxy group" refers to "alkyl-O—", wherein the term "alkyl" has the same meaning as described above.

As used herein, when a definition is not otherwise provided, the term "alkenyl group" refers to a straight or branched chain, monovalent hydrocarbon group having at least one carbon-carbon double bond.

As used herein, when a definition is not otherwise provided, the term "alkynyl group" refers to a straight or branched chain, monovalent hydrocarbon group having at least one carbon-carbon triple bond.

As used herein, when a definition is not otherwise provided, the term "cycloalkyl group" refers to a monovalent group having one or more saturated rings in which all ring members are carbon.

As used herein, when specific definition is not otherwise provided, the term "cycloalkenyl group" refers to a monovalent group having one or more rings and one or more carbon-carbon double bond in the ring, wherein all ring members are carbon.

As used herein, when specific definition is not otherwise provided, the term "cycloalkynyl group" refers to a monovalent group having one or more rings and one or more carbon-carbon triple bond in the ring, wherein all ring members are carbon.

As used herein, when specific definition is not otherwise provided, the term "acyl group" refers to "alkyl—C(=O)—", wherein the term "alkyl" has the same meaning as described above.

As used herein, when a definition is not otherwise provided, the term "heterocycloalkyl group" refers to a cycloalkyl group as defined above, wherein at least one (e.g. 1 to 3) carbon atoms are replaced with heteroatoms selected from N, O, S, Si, and P.

As used herein, when a definition is not otherwise provided, the term "aryl", which is used alone or in combination, refers to an aromatic hydrocarbon group containing at least one ring and having the specified number of carbon atoms. The term "aryl" may be construed as including a group with an aromatic ring fused to at least one cycloalkyl ring.

As used herein, when a definition is not otherwise provided, the term "heteroaryl group" refers to an aryl group including carbon and at least one (e.g. 1 to 3) heteroatoms selected from the group consisting of N, O, S, Si, and P as ring atoms.

As used herein, when a definition is not otherwise provided, the term "arylalkyl group" refers to a substituted or unsubstituted aryl group covalently linked to an alkyl group that is linked to a compound.

As used herein, when a definition is not otherwise provided, the term "heteroarylalkyl group" refers to a substituted or unsubstituted heteroaryl group covalently linked to an alkyl group that is linked to a compound.

As used herein, when a definition is not otherwise provided, the term "hetero" refers to inclusion of one to three heteroatoms selected from N, O, S, Si, and P.

As used herein, the term "alkylene group" refers to a straight or branched saturated aliphatic hydrocarbon group having a valence of at least two, optionally substituted with one or more substituents.

As used herein, when a definition is not otherwise provided, the term "arylene group" refers to a functional group having a valence of at least two obtained by removal of at least two hydrogens in an aromatic ring, optionally substituted with one or more substituents.

As used herein, when a definition is not otherwise provided, the term "heteroarylene group" refers to a functional group having a valence of at least two obtained by removal of at least two hydrogens in an aromatic ring, containing at least one (e.g., one to three) heteroatoms selected from the group consisting of N, O, S, Si, and P as ring-forming elements, optionally substituted with one or more substituents where indicated, provided that the valence of the heteroarylene group is not exceeded.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted C1 to C30 alkyl" refers to a C1 to C30 alkyl group substituted with a C6 to C30 aryl group, the total number of carbon atoms in the resulting aryl substituted alkyl group is C7 to C60.

As used herein, the term "aliphatic organic group" refers to a C1 to C30 linear or branched alkyl group, C2 to C30 linear or branched alkenyl group, and C2 to C30 linear or branched alkynyl group, the term "aromatic organic group" refers to a C6 to C30 aryl group or a C2 to C30 heteroaryl group, and the term "alicyclic organic group" refers to a C3 to C30 cycloalkyl group, a C3 to C30 cycloalkenyl group, and a C3 to C30 cycloalkynyl group.

As used herein, the term "(meth)acrylate" refers to acrylate and/or methacrylate.

As used herein, the term "hydrophobic moiety" refers to a moiety that causes a given compound including the same to show agglomeration in an aqueous solution and to have a tendency to repel water. For example, the hydrophobic moiety may include an aliphatic hydrocarbon group having a carbon number of greater than or equal to 2 (alkyl, alkenyl, alkynyl, etc.), an aromatic hydrocarbon group having a carbon number of greater than or equal to 6 (phenyl, naphthyl, arylalkyl group, etc.), or an alicyclic hydrocarbon group having a carbon number of greater than or equal to 5 (cyclohexyl, norbornene, etc.). The hydrophobic moiety substantially lacks an ability to make a hydrogen bond with an ambient medium and is not substantially mixed with the medium as its polarity does not match that of the medium.

As used herein, the term "absolute quantum yield (Abs QY)" refers to the value calculated from the following equation:

[(the number of photons emitted from the quantum dot)/(the number of photons supplied to the quantum dot)]×100.

The "absolute quantum yield (Abs QY)" may be obtained by measuring the light emitting efficiency in an integrating sphere or by comparing the relative efficiency with respect to that of the standard sample. As the standard sample, coumarine may be used for a green light emitting quantum dot and rhodamine 6 g may be used for a red light emitting quantum dot.

As used herein, the moiety derived from the thiol includes a thiol, a moiety formed by the reaction between the thiol and the quantum dot, and a moiety formed by the reaction between the thiol and the photopolymerizable monomer (e.g., a thiol and a thiolate).

As used herein, the term "conversion efficiency" refers to a ratio of emitted light with respect to incident light. In some embodiments, the conversion efficiency may be a ratio of emitted light amount of the quantum dot polymer composite with respect to the irradiated light amount from the excitation light (e.g., blue light).

As used herein, the term "dispersion" refers to a dispersion, wherein a dispersed phase is a solid and a continuous phase includes a liquid. For example, the term "dispersion" may refer to a colloidal dispersion wherein the dispersed phase has a dimension of about 1 nm to about several micrometers (μm) (e.g., 1 μm or less, 2 μm or less, or 3 μm or less).

As used herein, "Group III" refers to Group IIIA and Group IIIB, and examples of Group III metal may be Al, In, Ga, and Tl, but are not limited thereto.

As used herein, "Group IV" refers to Group IVA and Group IVB, and examples of a Group IV metal may be Si, Ge, and Sn, but are not limited thereto. As used herein, the term "metal" may include a semi-metal such as Si.

As used herein, "Group I" refers to Group IA and Group IB, and examples may include Li, Na, K, Ru, and Cs, but are not limited thereto.

As used herein, "Group V" refers to Group VA, and examples may include N, P, As, Sb, and Bi, but are not limited thereto.

As used herein, "Group VI" refers to Group VIA, and examples may include S, Se, and Te, but are not limited thereto.

In an embodiment, a composition includes:
a plurality of quantum dots (that may have an organic ligand on a surface thereof);
a binder polymer (e.g., containing a carboxylic acid group (—COOH))
a thiol compound having at least two thiol groups (e.g., at its terminal ends);
a polyvalent metal compound;
a photopolymerizable monomer having a carbon-carbon double bond;
a photoinitiator; and
a solvent.

The plurality of quantum dots may be dispersed (for example, separated from one another) by the carboxylic acid group (—COOH)-containing polymer to form a quantum dot dispersion. The quantum dot dispersion includes the carboxylic acid group (—COOH)-containing polymer and the plurality of quantum dots dispersed in the carboxylic acid group (—COOH)-containing polymer. The quantum dot dispersion may further include a solvent.

The quantum dot (hereinafter also referred to as a semiconductor nanocrystal) is not particularly limited, and may be prepared by any known method or is a commercially available. For example, the quantum dot may be a Group II-VI compound, a Group III-V compound, a Group IV-VI compound, a Group IV element or compound, a Group I-II-IV-VI compound, or a combination thereof.

The Group II-VI compound may be selected from:
a binary element compound selected from CdSe, CdTe, ZnS, ZnSe, ZnTe, ZnO, HgS, HgSe, HgTe, MgSe, MgS, and a combination thereof;
a ternary element compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a combination thereof; and a quaternary element compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a combination thereof.

The Group II-VI compound may further include a Group III metal.

The Group III-V compound may be selected from:

a binary element compound selected from GaN, GaP, GaAs, GaSb, AlN, AlP, AlAs, AlSb, InN, InP, InAs, InSb, and a combination thereof;

a ternary element compound selected from GaNP, GaNAs, GaNSb, GaPAs, GaPSb, AlNP, AlNAs, AlNSb, AlPAs, AlPSb, InNP, InNAs, InNSb, InPAs, InPSb, InZnP, and a combination thereof; and a quaternary element compound selected from GaAlNP, GaAlNAs, GaAlNSb, GaAlPAs, GaAlPSb, GaInNP, GaIn-NAs, GaInNSb, GaInPAs, GaInPSb, InAlNP, InAlNAs, InAlNSb, InAlPAs, InAlPSb, and a combination thereof.

The Group III-V compound may further include a Group II metal (e.g., InZnP).

The Group IV-VI compound may be selected from:

a binary element compound selected from SnS, SnSe, SnTe, PbS, PbSe, PbTe, and a combination thereof;

a ternary element compound selected from SnSeS, SnSeTe, SnSTe, PbSeS, PbSeTe, PbSTe, SnPbS, SnPbSe, SnPbTe, and a combination thereof; and a quaternary element compound selected from SnPbSSe, SnPbSeTe, SnPbSTe, and a combination thereof.

Examples of the Group compound may include CuInSe$_2$, CuInS$_2$, CuInGaSe, and CuInGaS, but are not limited thereto.

Examples of the Group I-II-IV-VI compound may include CuZnSnSe and CuZnSnS, but are not limited thereto.

The Group IV element or compound may include:

a single-element selected from Si, Ge, and a combination thereof; and a binary element compound selected from SiC, SiGe, and a combination thereof.

The binary element compound, the ternary element compound or the quaternary element compound may be respectively included in a uniform concentration in the particle or partially different concentrations in the same particle. The semiconductor nanocrystal particle may have a core-shell structure, wherein a first semiconductor nanocrystal is surrounded by a second semiconductor nanocrystal that is different from the first semiconductor nanocrystal. At the interface between the core and the shell, an alloy interlayer may be present or may not be present. When the quantum dot has an alloy interlayer, the interface between the core and the shell may have a concentration gradient, wherein the concentration of an element of the shell changes (e.g., decreases or increases) toward the core. In addition, the shell may include a multi-layered shell having at least two layers. In the multi-layered shell, each layer may have a single composition, an alloy, or the one having a concentration gradient.

In the core-shell semiconductor nanocrystal particle, the materials of the shell may have a larger energy bandgap than that of the core (e.g., type I) or vice versa (type II). In case of the multi-layered shell, the bandgap of the material of an outer layer of the shell may be higher energy than that of the material of an inner layer of the shell (a layer that is closer to the core).

The semiconductor nanocrystal may emit light of a wavelength of about 350 to about 750 nm, for example, about 400 to about 700 nm, but it is not limited thereto. The semiconductor nanocrystal may emit light of a wavelength of greater than or equal to about 750 nm, e.g., greater than or equal to about 800 nm, greater than or equal to about 900 nm, or greater than or equal to about 1,000 nm.

The semiconductor nanocrystal may have a quantum yield (or a quantum efficiency) of greater than or equal to about 10%, or greater than or equal to about 30%, for example, greater than or equal to about 50%, greater than or equal to about 60%, greater than or equal to about 70%, or greater than or equal to about 90%.

The semiconductor nanocrystal may have a FWHM of less than or equal to about 45 nm, for example less than or equal to about 40 nm, or less than or equal to about 30 nm. While not wishing to be bound by theory, it is understood that within such ranges, a device including the nanocrystal may have enhanced color purity or improved color reproducibility.

The quantum dot (i.e., the semiconductor nanocrystal particle) may have a particle diameter (in case of a non-spherically shaped particle, a longest length of a straight line crossing the particle) of about 1 nm to about 100 nm. For example, the quantum dot may have a particle diameter of about 1 nm to about 20 nm, for example, from 2 nm (or from 3 nm) to 15 nm. In some embodiments, the quantum dot have a diameter of greater than or equal to about 2 nm, greater than or equal to about 3 nm, greater than or equal to about 4 nm, or greater than or equal to about 5 nm and of less than or equal to about 50 nm, less than or equal to about 45 nm, less than or equal to about 40 nm, less than or equal to about 35 nm, less than or equal to about 30 nm, or less than or equal to about 25 nm.

The quantum dot may have a generally-used shape in this art, and is not particularly limited. For example, the quantum dot may include spherical, pyramidal, multi-armed, or cubic nanoparticles, nanotubes, nanowires, nanofibers, nanoplate particles, a combination thereof, or the like.

The quantum dot is commercially available or may be synthesized in any method. For example, several nano-sized quantum dots may be synthesized by a wet chemical process. In the wet chemical process, precursors react in an organic solvent to grow nanocrystal particles, and the organic solvent or a ligand compound may coordinate (or be bound) to the surface of the semiconductor nanocrystal, thereby controlling the growth of the nanocrystal. Examples of the organic solvent and ligand compound are known. The organic solvent coordinated to the surface of the quantum dot may affect stability of a device, and thus, excess organic materials that are not coordinated to the surface of the quantum dot may be removed by pouring the quantum dot into an excessive amount of a non-solvent, and centrifuging the resulting mixture. Examples of the non-solvent may be acetone, ethanol, methanol, and the like, but are not limited thereto.

The quantum dot may have an organic ligand (e.g., having a hydrophobic moiety) bonded to a surface thereof. In an embodiment, the organic ligand may include RCOOH, RNH$_2$, R$_2$NH, R$_3$N, RSH, R$_3$PO, R$_3$P, ROH, RCOOR', RPO(OH)$_2$, R$_2$POOH (wherein R and R' are independently a C5 to C24 alkyl group, a C5 to C24 alkenyl group, or a C5 to C20 aryl group), a polymeric organic ligand, or a combination thereof.

Examples of the organic ligand compound may include:

thiol compounds such as methane thiol, ethane thiol, propane thiol, butane thiol, pentane thiol, hexane thiol, octane thiol, dodecane thiol, hexadecane thiol, octadecane thiol, or benzyl thiol;

amine compounds such as methylamine, ethylamine, propylamine, butylamine, pentylamine, hexylamine, octylamine, nonylamine, decylamine, dodecylamine, hexadecylamine, octadecylamine, dimethylamine, diethylamine, dipropylamine, tributylamine, or trioctylamine, carboxylic acid compounds such as methanoic acid, ethanoic acid, propanoic acid, butanoic acid, pentanoic acid, hexanoic acid, heptanoic acid, octanoic acid, dodecanoic acid, hexadecanoic acid, octadecanoic acid, oleic acid, or benzoic acid;

phosphine compounds such as methyl phosphine, ethyl phosphine, propyl phosphine, butyl phosphine, pentyl phosphine, octyl phosphine, dioctyl phosphine, tributyl phosphine, or trioctyl phosphine;

phosphine oxide compounds such as methyl phosphine oxide, ethyl phosphine oxide, propyl phosphine oxide, butyl phosphine oxide, pentyl phosphine oxide, tributyl phosphine oxide, octylphosphine oxide, dioctyl phosphine oxide, or trioctyl phosphine oxide;

diphenyl phosphine, triphenyl phosphine, or oxide compounds thereof;

a C5 to C20 alkylphosphinic acid such as hexylphosphinic acid, octylphosphinic acid, dodecanephosphinic acid, tetradecanephosphinic acid, hexadecanephosphinic acid, or octadecane phosphinic acid;

and the like, but are not limited thereto.

The quantum dot may include the hydrophobic organic ligand alone or as a mixture of two or more.

An amount of the quantum dot including the organic ligand may be greater than or equal to about 1 percent by weight (wt %), for example, greater than or equal to about 2 wt %, greater than or equal to about 3 wt %, greater than or equal to about 4 wt %, greater than or equal to about 5 wt %, greater than or equal to about 6 wt %, greater than or equal to about 7 wt %, greater than or equal to about 8 wt %, greater than or equal to about 9 wt %, greater than or equal to about 10 wt %, greater than or equal to about 11 wt %, greater than or equal to about 12 wt %, greater than or equal to about 13 wt %, greater than or equal to about14 wt %, or greater than or equal to about 15 wt %, based on the total amount of the composition. The amount of the quantum dot including the organic ligand may be less than or equal to about 60 wt %, for example, less than or equal to about 55 wt %, less than or equal to about 50 wt %, less than or equal to about 45 wt %, less than or equal to about 40 wt %, or less than or equal to about 35 wt %, based on the total amount of the composition. In some embodiments, the amount of the quantum dot including the organic ligand may be about 1 wt % to 70 wt %, based on a total weight of solid contents (non-volatile components) of the compositions.

The quantum dot may have a theoretical quantum yield (QY) of about 100%, and may emit light having high color purity (e.g., a full width at half maximum (FWHM) of less than or equal to about 40 nm), and thus, it may achieve the enhanced luminous efficiency and the improved color reproducibility. The quantum dots may be utilized in the form of a polymer composite. As the quantum dots has a poor miscibility with a polymer, uniformly dispersing them in a polymer matrix is not easy. In addition, the process for preparation of the quantum dot polymer matrix may involve a heat treatment. However, the heat treatment may result in a significant loss of the organic ligand coordinating to the surface of the quantum dot, leading to deterioration of light emitting properties of the quantum dots. Thus, the dispersibility and stability (e.g., the maintenance rate of photoconversion efficiency after the heat treatment) of the quantum dots in the composite may be an important factor.

In this regard, some attempts of coating the quantum dot with a highly heat resistant polymer (e.g., polycarbonate) or encapsulating the same with a polymer having a certain functional group have been made. However, such methods tend to involve complex procedures. In addition, such methods cannot provide dispersibility and stability to the extent required for the quantum dot polymer composite.

The compositions according to the embodiments may produce a quantum dot polymer composite that includes the quantum dots uniformly dispersed in the polymer and has improved stability (e.g. heat stability). In addition, the composition of the embodiments and the composite prepared therefrom may be produced in a relatively simple manner.

By including the compound having at least two thiol groups (the multi-thiol compound) and the polyvalent metal compound together with the binder polymer, the composition of the embodiments may keep the dispersibility of the quantum dots and provide a significantly enhanced level of heat stability. Without wishing to be bound by any theory, in the composition of the embodiments, the binder polymer may contribute to maintaining the dispersibility of the quantum dots and at the same time, the presence of the polyvalent metal ions may allow the multi-thiol compound to bind the plurality of the quantum dots to each other. For example, in the presence of the polyvalent metal ions (the polyvalent metal compound), the thiol groups of the multi-thiol compounds may easily linked to the surface of the quantum dots or may be easily exchanged with the organic ligand, which is already present on the surface of the quantum dot. As a result, the multi-thiol compound having at least two thiol groups at its terminal ends may provide a link between the quantum dots as dispersed in the polymer.

The composition of the embodiments may have the aforementioned link between the quantum dots so that the dispersibility of the quantum dots may be maintained while the density (or compactness) of the prepared composite may be further increased, enabling the composite prepared therefrom to show greatly improved surface quality.

In the composition, the binder polymer includes a copolymer of a monomer combination including a first monomer having a carboxylic acid group and a carbon-carbon double bond, a second monomer having a carbon-carbon double bond and a hydrophobic moiety and not having a carboxylic acid group, and optionally, a third monomer having a carbon-carbon double bond and a hydrophilic moiety and not having a carboxylic acid group; a multiple aromatic ring-containing polymer including a carboxylic acid group (—COOH) and having a main chain that includes a backbone structure incorporated in the main chain, wherein the backbone structure includes a quaternary carbon atom, which is a part of a cyclic group, and two aromatic rings bound to the quaternary carbon atom;

or a combination thereof.

At least two quantum dots of the plurality of quantum dots are linked to each other by the thiol compound, and at the same time, the dispersed state of the plurality of quantum dots may be well maintained by the binder polymer.

The copolymer may include a first repeating unit derived from the first monomer, a second repeating unit derived from the second monomer, and optionally, a third repeating unit derived from the third monomer.

The first repeating unit may include a unit represented by Chemical Formula 1-1, a unit represented by Chemical Formula 1-2, or a combination thereof:

Chemical Formula 1-1

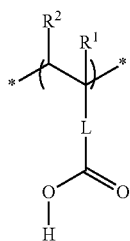

wherein $R^1$ is hydrogen, a C1 to C3 alkyl group, or —$(CH_2)_n$—COOH (wherein n is 0 to 2), $R^2$ is hydrogen, a C1 to C3 alkyl group, or —COOH, L is a single bond, a C1 to C15 aliphatic hydrocarbon group, a C6 to C30 aromatic hydrocarbon group, a C3 to C30 alicyclic hydrocarbon group, or a C1 to C15 aliphatic hydrocarbon group substituted with a C6 to C30 aromatic hydrocarbon group or a C3 to C30 alicyclic hydrocarbon group, and

* indicates a portion linked to an adjacent atom;

Chemical Formula 1-2

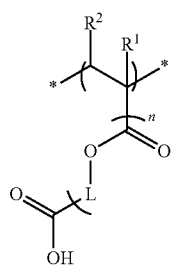

wherein $R^1$ is hydrogen, a C1 to C3 alkyl group, or —$(CH_2)_{n1}$—COOH (wherein n1 is 0 to 2), $R^2$ is hydrogen or a C1 to C3 alkyl group, L is a C1 to C15 alkylene group, a C1 to C15 alkylene group wherein at least one methylene group is substituted with —C(=O)—, —O—, or —C(=O)O—, a C6 to C30 aromatic hydrocarbon group, a C3 to C30 alicyclic hydrocarbon group, or a C1 to C15 aliphatic hydrocarbon group substituted with a C6 to C30 aromatic hydrocarbon group or a C3 to C30 alicyclic hydrocarbon group, n is an integer of 1 to 3, and

* indicates a portion linked to an adjacent atom.

The second repeating unit may include a unit represented by Chemical

Formula 2-1, a unit represented by Chemical Formula 2-2, a unit represented by Chemical Formula 2-3, a unit represented by Chemical Formula 2-4, or a combination thereof:

Chemical Formula 2-1

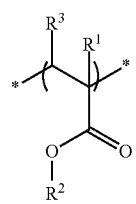

wherein $R^1$ is hydrogen or a C1 to C3 alkyl group, $R^2$ is a C1 to C15 aliphatic hydrocarbon group, a C6 to C30 aromatic hydrocarbon group, a C3 to C30 alicyclic hydrocarbon group, or a C1 to C15 aliphatic hydrocarbon group substituted with a C6 to C30 aromatic hydrocarbon group or a C3 to C30 alicyclic hydrocarbon group, $R^3$ is hydrogen or a C1 to C3 alkyl group, and

* indicates a portion linked to an adjacent atom;

Chemical Formula 2-2

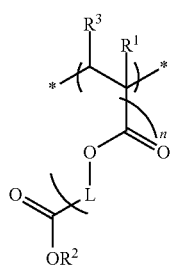

$R^1$ is hydrogen or a C1 to C3 alkyl group,

L is a C1 to C15 alkylene group, a C1 to C15 alkylene group wherein at least one methylene group is substituted with —C(=O)—, —O—, or —C(=O)O—, a C6 to C30 aromatic hydrocarbon group, a C3 to C30 alicyclic hydrocarbon group, or a C1 to C15 aliphatic hydrocarbon group substituted with a C6 to C30 aromatic hydrocarbon group or a C3 to C30 alicyclic hydrocarbon group, $R^2$ is a C1 to C15 aliphatic hydrocarbon group, a C6 to C30 aromatic hydrocarbon group, a C3 to C30 alicyclic hydrocarbon group, or a C1 to C15 aliphatic hydrocarbon group substituted with a C6 to C30 aromatic hydrocarbon group or a C3 to C30 alicyclic hydrocarbon group, $R^3$ is hydrogen or a C1 to C3 alkyl group, n is an integer of 1 to 3, and

* indicates a portion linked to an adjacent atom;

Chemical Formula 2-3

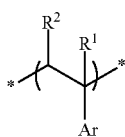

wherein
each of $R^1$ and $R^2$ is independently hydrogen or a C1 to C3 alkyl group,
Ar is a substituted or unsubstituted C6 to C30 aromatic hydrocarbon group or a substituted or unsubstituted C3 to C30 alicyclic hydrocarbon group, and
* indicates a portion linked to an adjacent atom;

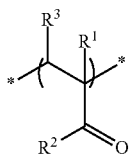

Chemical Formula 2-4 wherein
$R^1$ is hydrogen or a C1 to C3 alkyl group, $R^2$ is a C1 to C15 aliphatic hydrocarbon group, a C6 to C30 aromatic hydrocarbon group, a C3 to C30 alicyclic hydrocarbon group, or a C1 to C15 aliphatic hydrocarbon group substituted with a C6 to C30 aromatic hydrocarbon group or a C3 to C30 alicyclic hydrocarbon group,
$R^3$ is hydrogen or a C1 to C3 alkyl group, and
* indicates a portion linked to an adjacent atom.
The third repeating unit derived from the third monomer may be represented by Chemical Formula 3:

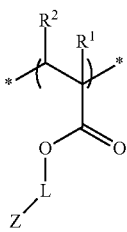

Chemical Formula 3 wherein
each of $R^1$ and $R^2$ is independently hydrogen or a C1 to C3 alkyl group,
L is a C1 to C15 alkylene group, a C1 to C15 alkylene group wherein at least one methylene group is substituted with —C(=O)—, —O—, or —C(=O)O—, a C6 to C30 aromatic hydrocarbon group, a C3 to C30 alicyclic hydrocarbon group, or a C1 to C15 aliphatic hydrocarbon group substituted with a C6 to C30 aromatic hydrocarbon group or a C3 to C30 alicyclic hydrocarbon group,
Z is a hydroxyl group (—OH), a mercapto group (—SH), or an amino group —HR, wherein R is hydrogen or a C1 to C5 alkyl group) and
* indicates a portion linked to an adjacent atom.
Examples of the first monomer may include, but are not limited to, acrylic acid, methacrylic acid, maleic acid, itaconic acid, fumaric acid, 3-butenoic acid, carboxylic acid vinyl ester compounds such as vinyl acetate, and vinyl benzoate. The first monomer may include one or more compounds.
Examples of the second monomer may include, but are not limited to:
alkenyl aromatic compounds such as styrene, a-methyl styrene, vinyl toluene, or vinyl benzyl methyl ether;
unsaturated carboxylic acid ester compounds such as methyl acrylate, methyl methacrylate, ethyl acrylate, ethyl methacrylate, butyl acrylate, butyl methacrylate, benzyl acrylate, benzyl methacrylate, cyclohexyl acrylate, cyclohexyl methacrylate, phenyl acrylate, or phenyl methacrylate;
unsaturated carboxylic acid amino alkyl ester compounds such as 2-amino ethyl acrylate, 2-amino ethyl methacrylate, 2-dimethyl amino ethyl acrylate, or 2-dimethyl amino ethyl methacrylate;
maleimides such as N-phenylmaleimide, N-benzylmaleimide, N-alkylmaleimide;
unsaturated carboxylic acid glycidyl ester compounds such as glycidyl acrylate or glycidyl methacrylate;
vinyl cyanide compounds such as acrylonitrile or methacrylonitrile; and
unsaturated amide compounds such as acrylamide or methacrylamide,
but are not limited thereto.
As the second monomer, at least one compound may be used.
Examples of the third monomer may include 2-hydroxy ethyl acrylate, 2-hydroxy ethyl methacrylate, 2-hydroxy butyl acrylate, and 2-hydroxy butyl methacrylate, but are not limited thereto. The third monomer may include one or more compounds.
In the binder polymer, an amount of the first repeating unit derived from the first monomer may be greater than or equal to about 10 mole percent (mol %), for example, greater than or equal to about 15 mol %, greater than or equal to about 25 mol %, or greater than or equal to about 35 mol %. In the binder polymer, an amount of the first repeating unit may be less than or equal to about 90 mol %, for example, less than or equal to about 89 mol %, less than or equal to about 88 mol %, less than or equal to about 87 mol %, less than or equal to about 86 mol %, less than or equal to about 85 mol %, less than or equal to about 80 mol %, less than or equal to about 70 mol %, less than or equal to about 65 mol %, less than or equal to about 45 mol %, less than or equal to about 35 mol %, or less than or equal to about 25 mol %.
In the binder polymer, an amount of the second repeating unit derived from the second monomer may be greater than or equal to about 10 mol %, for example, greater than or equal to about 15 mol %, greater than or equal to about 25 mol %, or greater than or equal to about 35 mol %. In the binder polymer, an amount of the second repeating unit may be less than or equal to about 90 mol %, for example, less than or equal to about 89 mol %, less than or equal to about 88 mol %, less than or equal to about 87 mol %, less than or equal to about 86 mol %, less than or equal to about 85 mol %, less than or equal to about 80 mol %, less than or equal to about 70 mol %, less than or equal to about 65 mol %, less than or equal to about 40 mol %, less than or equal to about 35 mol %, or less than or equal to about 25 mol %.
In the binder polymer, an amount of the third repeating unit derived from the third monomer may be greater than or equal to about 1 mol %, for example, greater than or equal to about 5 mol %, greater than or equal to about 10 mol %, or greater than or equal to about 15 mol %. In the binder polymer, an amount of the third repeating unit may be less than or equal to about 30 mol %, for example, less than or equal to about 25 mol %, less than or equal to about 20 mol %, less than or equal to about 18 mol %, less than or equal to about 15 mol %, or less than or equal to about 10 mol %.
In an embodiment, the binder polymer may be a copolymer of (meth)acrylic acid (i.e., the first monomer) and at least one second or third monomer selected from arylalkyl (meth)acrylate, hydroxyalkyl (meth)acrylate, and styrene. For example, the binder polymer may include a methacrylic acid/methyl methacrylate copolymer, a methacrylic acid/ benzyl methacrylate copolymer, a methacrylic acid/benzyl methacrylate/styrene copolymer, a methacrylic acid/benzyl methacrylate/2-hydroxy ethyl methacrylate copolymer, or a methacrylic acid/benzyl methacrylate/styrene/2-hydroxy ethyl methacrylate copolymer.

In another embodiment, the binder polymer may include a multiple aromatic ring-containing polymer including a carboxylic acid group (—COON) and a main chain including a backbone structure incorporated in the main chain, wherein the backbone structure includes a quaternary carbon atom, which is a part of a cyclic group, and two aromatic rings bound to the quaternary carbon atom. In some embodiments, the carboxylic acid group (—COON) may be bound to the main chain (e.g., the backbone structure).

In the multiple aromatic ring-containing polymer, the backbone structure may include a repeating unit represented by Chemical Formula A:

Chemical Formula A

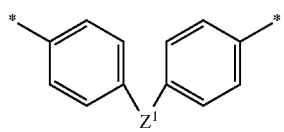

wherein

* indicates a portion that is linked to an adjacent atom of the main chain of the binder, $Z^1$ is a linking moiety represented by any one of Chemical Formulae B-1 to B-6, and in Chemical Formulae A-1 to A-6, * indicates a portion that is linked to an adjacent atom:

Chemical Formula A-1

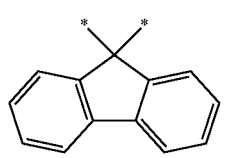

Chemical Formula A-2

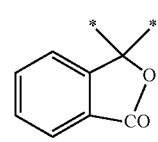

Chemical Formula A-3

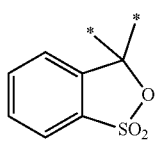

Chemical Formula A-4

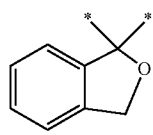

Chemical Formula A-5

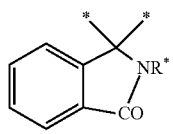

wherein $R^a$ is hydrogen, an ethyl group, $C_2H_4Cl$, $C_2H_4OH$, $CH_2CH=CH_2$, or a phenyl group, Chemical Formula A-6

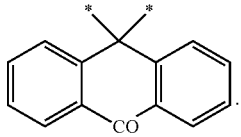

The multiple aromatic ring-containing polymer may include a repeating unit represented by Chemical Formula B:

Chemical Formula B

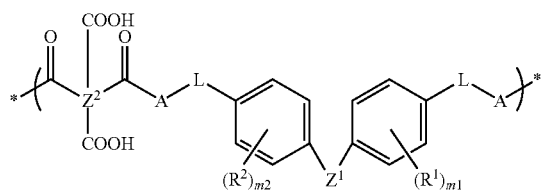

wherein $Z^1$ is a linking moiety represented by any one of Chemical Formulae A-1 to A-6, L is a single bond, a C1 to C10 alkylene, a C1 to C10 alkylene having a substituent including a carbon-carbon double bond, a C1 to C10 oxy alkylene, or a C1 to C10 oxy alkylene having a substituent including a carbon-carbon double bond, A is —NH—, —O—, or a C1 to C10 alkylene, each of $R^1$ and $R^2$ is independently hydrogen, a halogen, or a substituted or unsubstituted C1 to C20 alkyl group, m1 and m2 are independently an integer ranging from 0 to 4, $Z^2$ is a C6 to C40 aromatic organic group, and

* indicate a portion that is linked to an adjacent atom.

In Chemical Formula B, $Z^2$ may be any one of Chemical Formula B-1,

Chemical Formula B-2, and Chemical Formula B-3:

Chemical Formula B-1

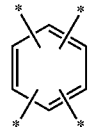

wherein * indicates a portion that is linked to an adjacent carbonyl carbon,

Chemical Formula B-2

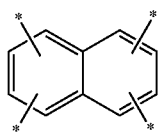

wherein * indicates a portion that is linked to an adjacent carbonyl carbon,

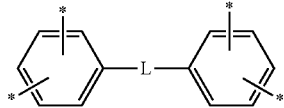

Chemical Formula B-3 wherein * indicates a portion that is linked to an adjacent carbonyl carbon,

L is a single bond, —O—, —S—, —C(=O)—, —CH(OH)—, —S(=O)2—, —Si(CH$_3$)$_2$—, —(CH$_2$)$_p$— (wherein 1≤p≤10), —(CF$_2$)$_q$— (wherein 1≤p≤0), —CR$_2$— (wherein R is independently hydrogen, a C1 to C10 aliphatic hydrocarbon group, a C6 to C20 aromatic hydrocarbon group, or a C6 to C20 alicyclic hydrocarbon group), —C(CF$_3$)$_2$—, —C(CF$_3$)(C$_6$H$_5$)—, or —C(=O)NH—.

The multiple aromatic ring-containing polymer may include a structural unit represented by Chemical Formula C:

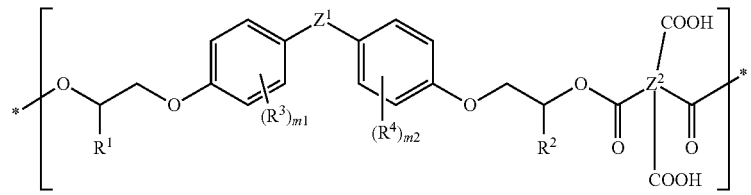

Chemical Formula C wherein each of $R^1$ and $R^2$ is independently hydrogen or a substituted or unsubstituted (meth)acryloyloxyalkyl group, each of $R^3$ and $R^4$ is independently hydrogen, a halogen, or a substituted or unsubstituted C1 to C20 alkyl group, $Z^1$ is a moiety selected from linking moieties represented by Chemical Formulae B-1 to B-6, $Z^2$ is an aromatic organic group such as the moieties set forth above, m1 and m2 are independently an integer ranging from 0 to 4, and

* indicates a portion that is linked to an adjacent atom.

In some embodiments, the multiple aromatic ring-containing polymer may be an acid adduct of bisphenol fluorene epoxy acrylate. For example, the bisphenol fluorene epoxy acrylate may be prepared by reacting 4,4-(9-fluorenylidene)-diphenol and epichlorohydrine to obtain an epoxy compound having a fluorene moiety, and the epoxy compound is reacted with an acrylic acid to obtain a fluorenyl epoxy acrylate, which is then further reacted with biphenyl dianhydride and/or phthalic anhydride. The aforementioned reaction scheme may be summarized as below:

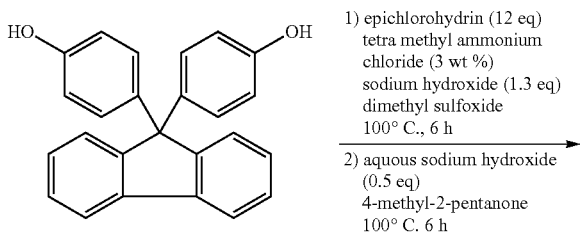

1) epichlorohydrin (12 eq)
   tetra methyl ammonium chloride (3 wt %)
   sodium hydroxide (1.3 eq)
   dimethyl sulfoxide
   100° C., 6 h
2) aquous sodium hydroxide (0.5 eq)
   4-methyl-2-pentanone
   100° C. 6 h

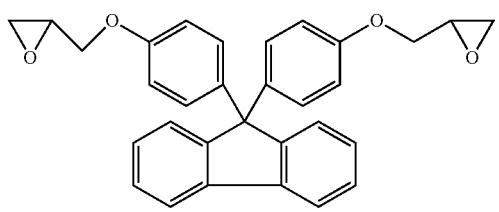

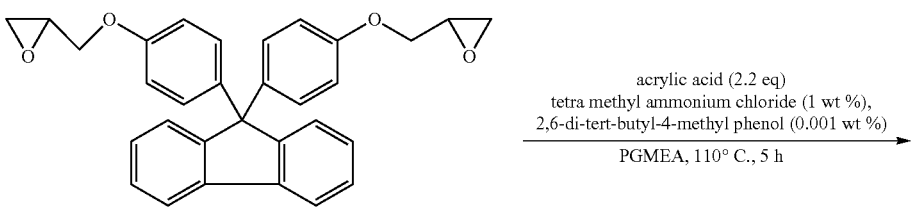

acrylic acid (2.2 eq)
tetra methyl ammonium chloride (1 wt %),
2,6-di-tert-butyl-4-methyl phenol (0.001 wt %)

PGMEA, 110° C., 5 h

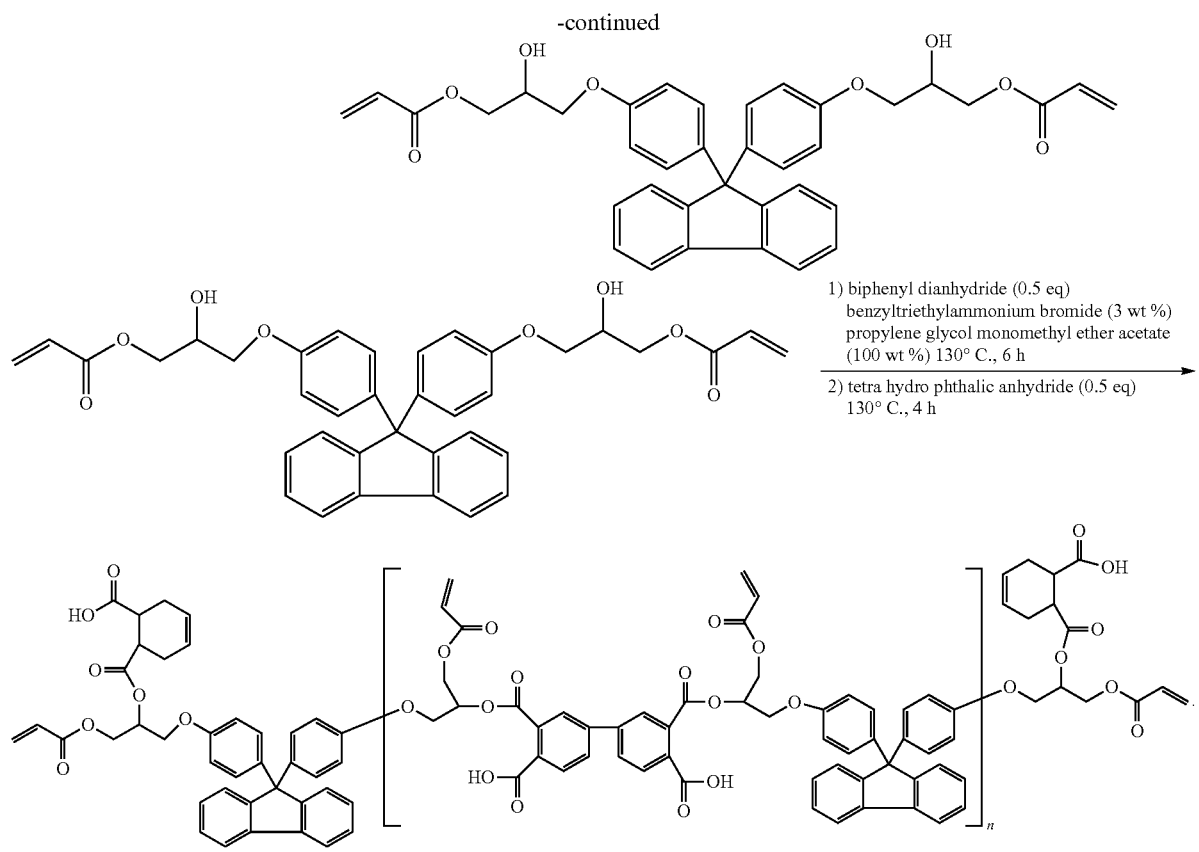

The multiple aromatic ring-containing polymer may include a functional group represented by Chemical Formula D at one or both terminal ends:

Chemical Formula D

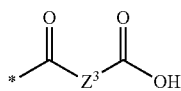

* indicates a portion that is linked to an adjacent atom, and $Z^3$ is a moiety represented by one of Chemical Formulae D-1 to D-7:

Chemical Formula D-1

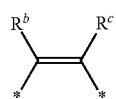

wherein each of $R^b$ and $R^c$ is independently hydrogen, a substituted or unsubstituted C1 to C20 alkyl group, a substituted or unsubstituted C1 to C20 alkyl group, wherein at least one methylene is replaced with an ester group, an ether group, or a combination thereof and

* indicates a portion that is linked to an adjacent atom.

Chemical Formula D-2

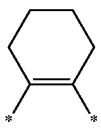

Chemical Formula D-3

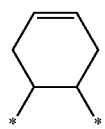

Chemical Formula D-4

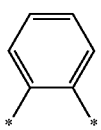

Chemical Formula D-5

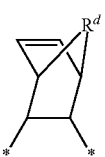

wherein $R^d$ is O, S, NH, a substituted or unsubstituted C1 to C20 alkylene group, a C1 to C20 alkylamine group, or a C2 to C20 alkenylamine group.

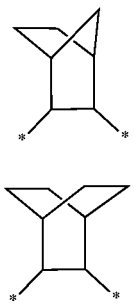

Chemical Formula D-6

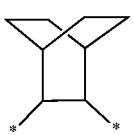

Chemical Formula D-7

The multiple aromatic ring-containing polymer may be synthesized by a known method or is commercially available (e.g., from Nippon Steel Chemical Co., Ltd.).

As non-limiting examples, the multiple aromatic ring-containing polymer may include a reaction product of a fluorene compound selected from 9,9-bis(4-hydroxyphenyl) fluorene, 9,9-bis(4-aminophenyl)fluorene, 9,9-bis[4-(glycidyloxy) phenyl]fluorene, and 9,9-bis[4-(2-hydroxyethoxy) phenyl]fluorene with an appropriate compound capable of reacting with the fluorene compound (e.g., an aromatic dianhydride selected from 9,9-bis-(3,4-dicarboxyphenyl) fluorene dianhydride, pyromellitic dianhydride (PDMA), biphenyltetracarboxylic dianhydride (BPDA), benzophenone tetracarboxylic dianhydride, and naphthalene tetracarboxylic dianhydride, a C2 to C30 diol compound, epichlorohydrine, or the like).

The fluorene compound, dianhydrides, a diol compound, and the like are commercially available, and the reaction conditions therebetween are known in the art.

The binder polymer may have an acid value of greater than or equal to about 50 milligrams of KOH per gram of the polymer (mg KOH/g) in order to disperse quantum dots, but the acid value may vary depending on a chemical structure thereof (e.g., a chemical structure of a main chain or a hydrophobic moiety at the side chain). For example, the binder polymer may have an acid value of greater than or equal to about 60 mg KOH/g, greater than or equal to about 70 mg KOH/g, greater than or equal to about 80 mg KOH/g, greater than or equal to about 90 mg KOH/g, greater than or equal to about 100 mg KOH/g, greater than or equal to about 110 mg KOH/g, greater than or equal to about 120 mg KOH/g, greater than or equal to about 125 mg KOH/g, or greater than or equal to about 130 mg KOH/g. The binder polymer may have an acid value of, for example, less than or equal to about 250 mg KOH/g, for example, less than or equal to about 240 mg KOH/g, less than or equal to about 230 mg KOH/g, less than or equal to about 220 mg KOH/g, less than or equal to about 210 mg KOH/g, less than or equal to about 200 mg KOH/g, less than or equal to about 190 mg KOH/g, less than or equal to about 180 mg KOH/g, less than or equal to about 170 mg KOH/g, or less than or equal to about 160 mg KOH/g, but it is not limited thereto.

While not wishing to be bound by theory, it is understood that when the quantum dots are mixed with a solution of a binder having the acid value within the aforementioned range to provide a quantum dot-binder dispersion, the obtained quantum dot-binder dispersion may have the improved compatibility with the other components for the compositions of the embodiments (e.g., photopolymerizable monomer, photoinitiator, solvent, etc.), and thereby the quantum dots may be relatively uniformly dispersed in the final composition (e.g., photoresist composition). Thus, the composition of the embodiments may include a quantum dot binder dispersion including the binder polymer and the quantum dots dispersed therein, the thiol compound, the polyvalent metal compound, the photopolymerizable monomer, and the photoinitiator. In an embodiment, the binder polymer may have an acid value of about 100 mg KOH/g to about 220 mg KOH/g.

The binder polymer (e.g., containing the carboxylic acid group) may have a molecular weight of greater than or equal to about 1,000 grams per mole (g/mol), for example, greater than or equal to about 2,000 g/mol, greater than or equal to about 3,000 g/mol, or greater than or equal to about 5,000 g/mol. The binder polymer may have a molecular weight of less than or equal to about 100,000 g/mol, for example, less than or equal to about 90,000 g/mol, less than or equal to about 80,000 g/mol, less than or equal to about 70,000 g/mol, less than or equal to about 60,000 g/mol, less than or equal to about 50,000 g/mol, less than or equal to about 40,000 g/mol, less than or equal to about 30,000 g/mol, less than or equal to about 20,000 g/mol, less than or equal to about 10,000 g/mol.

In the composition, an amount of the binder polymer may be greater than or equal to about 0.5 wt %, for example, greater than or equal to about 1 wt %, greater than or equal to about 5 wt %, greater than or equal to about 10 wt %, greater than or equal to about 15 wt %, or greater than or equal to about 20 wt %, based on the total weight of the composition. An amount of the binder polymer may be less than or equal to about 60 wt %, for example, less than or equal to about 55 wt %, less than or equal to about 50 wt %, less than or equal to about 45 wt %, less than or equal to about 40 wt %, less than or equal to about 35 wt %, or less than or equal to about 30 wt %, based on the total weight of the composition. In an embodiment, an amount of the binder polymer may be 0.5 to 70 wt %, based on the total weight of solids (i.e., non-volatiles) of the composition. While not wishing to be bound by theory, it is understood that within the aforementioned range, dispersibility of the quantum dots may be ensured.

The presence of the foregoing binder polymer having the aforementioned acid value may contribute to improving the quality of the composite prepared from the composition in accordance of the embodiments.

In some embodiments, the thiol compound having at least two thiol groups at its terminal ends may include a compound represented by Chemical Formula 4:

Chemical Formula 4

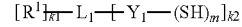

wherein $R^1$ comprises hydrogen, a substituted or unsubstituted C1 to C30 linear or branched alkyl group, a substituted or unsubstituted C6 to C30 aryl group, a substituted or unsubstituted C7 to C30 arylalkyl group, a substituted or unsubstituted C3 to C30 heteroaryl group, a substituted or unsubstituted C4 to C30 heteroarylalkyl group, a substituted or unsubstituted C3 to C30 cycloalkyl group, a substituted or unsubstituted C3 to C30 heterocycloalkyl group, a C1 to C10 alkoxy group, a hydroxy group, —$NH_2$, a substituted or unsubstituted C1 to C30 amine group (—NRR', wherein R and R' are independently hydrogen or a C1 to C30 linear or branched alkyl group); an isocyanate group; a halogen; —ROR' (wherein R is a substituted or unsubstituted C1 to C20 alkylene group and R' is hydrogen or a C1 to C20 linear or branched alkyl group); an acyl halide (—RC(=O)X, wherein R is a substituted or unsubstituted C1 to C20 alkylene group and X is a halogen), —C(=O)OR' (wherein R' is hydrogen or a C1 to C20 linear or branched alkyl group), —CN, —C(=O)NRR' (wherein R and R' are independently hydrogen or a C1 to C20 linear or branched alkyl group), —C(=O)ONRR' (wherein R and R' are independently hydrogen or a C1 to C20 linear or branched alkyl group), or a combination thereof, $L_1$ comprises a carbon atom, a substituted or unsubstituted C1 to C30 alkylene group, a substituted or unsubstituted C6 to C30 cycloalkylene group, a substituted or unsubstituted C6 to C30 arylene group, a substituted or unsubstituted C3 to C30 heteroarylene group, or a substituted or unsubstituted C3 to C30 heterocycloalkylene group, wherein at least one methylene (—CH$_2$—) of the substituted or unsubstituted C1 to C30 alkylene group may be replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 alkyl group), or a combination thereof, $Y_1$ comprises a single bond, a substituted or unsubstituted C1 to C30 alkylene group, a substituted or unsubstituted C2 to C30 alkenylene group, or a C1 to C30 alkylene group or a C2 to C30 alkenylene group wherein at least one methylene (—CH$_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—NR—) (wherein R is hydrogen or a C1 to C10 linear or branched alkyl group), or a combination thereof, m is an integer of 1 or more, k1 is 0 or an integer of 1 or more, k2 is an integer of 1 or more, and the sum of m and k2 is an integer of 3 or more, provided that m does not exceed the valence of $Y_1$ when $Y_1$ is not a single bond, and provided that the sum of k1 and k2 does not exceed the valence of $L_1$.

The thiol compound may include a compound of Chemical Formula 4-1:

Chemical Formula 4-1

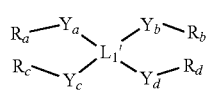

wherein $L_1'$ is carbon, a substituted or unsubstituted C2 to C20 group derived from an alkane, a substituted or unsubstituted C6 to C30 group derived from an arene, a substituted or unsubstituted C3 to C30 group derived from a heteroarene, a substituted or unsubstituted C3 to C30 group derived from a cycloalkane, or a substituted or unsubstituted C3 to C30 group derived from a heterocycloalkane, $Y_a$ to $Y_d$ are independently a single bond, a substituted or unsubstituted C1 to C30 alkylene group, a substituted or unsubstituted C2 to C30 alkenylene group, or a C1 to C30 alkylene group or a C2 to C30 alkenylene group wherein at least one methylene (—CH$_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—NR—) (wherein R is hydrogen or a C1 to C10 linear or branched alkyl group), or a combination thereof, and each of Ra to Rd is independently $R^1$ of Chemical Formula 1 or SH, provided that at least two of them are SH.

The thiol compound may link the plurality of the quantum dots to each other as explained above. In addition, the thiol compound may participate in the reaction with the photopolymerizable monomer without having an adverse effect on the dispersibility of the quantum dots to form a polymerization product (i.e., the thiol-ene polymer). Regarding the thiol-ene polymer, to the disclosure refers to US-2015-0218444-A1, which is incorporated herein by reference in its entirety.

The thiol compound may include a dithiol compound, a trithiol compound, a tetrathiol compound, or a combination thereof. For example, the thiol compound may include glycol di-3-mercaptopropionate, glycol dimercaptoacetate, trimethylolpropane tris(3-mercaptopropionate), pentaerythritol tetrakis(3-m ercaptopropionate), pentaerythritol tetrakis (2-mercaptoacetate), 1,6-hexanedithiol, 1,3-propanedithiol, 1,2-ethanedithiol, polyethylene glycol dithiol including 1 to 10 ethylene glycol repeating units, or a combination thereof.

In the composition, the amount of the thiol compound may be less than or equal to about 55 wt %, for example, less than or equal to about 50 wt %, less than or equal to about 45 wt %, less than or equal to about 40 wt %, less than or equal to about 35 wt %, less than or equal to about 30 wt %, less than or equal to about 25 wt %, less than or equal to about 20 wt %, less than or equal to about 19 wt %, less than or equal to about 18 wt %, less than or equal to about 17 wt %, less than or equal to about 16 wt %, less than or equal to about 15 wt %, less than or equal to about 14 wt %, less than or equal to about 13 wt %, less than or equal to about 12 wt %, less than or equal to about 10 wt %, less than or equal to about 9 wt %, less than or equal to about 8 wt %, less than or equal to about 7 wt %, less than or equal to about 6 wt %, less than or equal to about 5 wt %, based on the total weight of the composition. The amount of the thiol compound may be greater than or equal to about 0.1 wt %, for example, greater than or equal to about 0.5 wt %, or greater than or equal to about 1 wt %, based on the total weight of the composition.

The polyvalent metal compound may include a metal selected from Mg, Ca, Sc, Ti, V, Cr, Mn, Fe, Co, Ni, Cu, Zn, Ga, Sr, Y, Zr, Nb, Mo, Cd, In, Ba, Au, Hg, Tl, and a combination thereof. Without wishing to be bound by any theory, the polyvalent metal compound may facilitate the linking between the quantum dots and the thiol compound while maintaining the dispersibility of the quantum dots by the binder polymer having the carboxylic group. Thus, the composite prepared from the composition of the embodiments may show improved maintenance rate.

The polyvalent metal compound may include organic metal compound, an organic salt, an inorganic salt, or a combination thereof. The polyvalent metal compound may include a metal chloride such as zinc chloride, indium chloride, aluminum chloride, iron chloride, or manganese chloride, an alkylated metal (e.g., alkylated zinc) such as diethyl zinc, dipropyl zinc, dibutyl zinc, triethyl aluminum, tributyl aluminum, or the like, organic metal compound (e.g., a metal acetate such as zinc acetate, a metal (meth) acrylate such as zinc (meth)acrylate, a metal dialkyldithiocarbamate such as zinc diethyldithiocarbamate, indium acetate) or a combination thereof.

The amount of the polyvalent metal compound may be greater than or equal to about 0.01 wt %, for example, greater than or equal to about 0.05 wt %, greater than or equal to about 0.06 wt %, greater than or equal to about 0.07 wt %, greater than or equal to about 0.08 wt %, greater than or equal to about 0.09 wt %, greater than or equal to about 0.1 wt %, greater than or equal to about 0.15 wt %, or greater than or equal to about 0.2 wt %, based on the total amount of the composition. The amount of the polyvalent metal compound may be less than or equal to about 5 wt %, for example, less than or equal to about 4.5 wt %, less than or equal to about 4 wt %, less than or equal to about 3.5 wt %, or less than or equal to about 3 wt %, based on the total amount of the composition, but it is not limited thereto.

In the composition, according to an embodiment, the photopolymerizable monomer having at least one (e.g., two, three, four, five, six, or more) carbon-carbon double bonds may include a photopolymerizable (meth)acrylate monomer. Examples of the photopolymerizable (meth)acrylate monomer may include, but are not limited to, alkyl (meth)acrylate, ethylene glycol di(meth)acrylate, triethylene glycol di(meth) acrylate, diethylene glycol di(meth)acrylate, 1,4-butanediol di(meth)acrylate, 1,6-hexanediol di(meth)acrylate, neopentyl glycol di(meth)acrylate, pentaerythritol di(meth)acrylate, pentaerythritol tri(meth)acrylate, pentaerythritol tetra(meth)acrylate, dipentaerythritol di(meth)acrylate, dipentaerythritol tri(meth)acrylate, dipentaerythritol penta(meth)acrylate, dipentaerythritol hexa(meth)acrylate, bisphenol A epoxyacrylate, bisphenol A di(meth)acrylate, trimethylolpropane tri(meth)acrylate, ethylene glycol monomethyl ether (meth)acrylate, novolacepoxy (meth)acrylate, diethylene glycol di(meth)acrylate, triethylene glycol di(meth)acrylate, propylene glycol di(meth)acrylate, tris(meth)acryloyloxyethyl phosphate, and the like.

The photopolymerizable (meth)acrylate monomer may include a main monomer having 1 to 6 (meth)acrylate groups. If desired, the photopolymerizable (meth)acrylate monomer may include at least one of a first accessory monomer having 8 to 20 (meth)acrylate groups, and a second accessory monomer represented by Chemical Formula E:

Chemical Formula E $R^1O—(L_1)_m—L_3—A—L_4—(L_2)_n—OR^2$ wherein,

A is a C1 to C40 aliphatic hydrocarbon group, a C6 to C40 aromatic hydrocarbon group, a divalent moiety including two or more C6 to C40 aromatic hydrocarbon groups linked by a substituted or unsubstituted C1 to C10 alkylene, an ether, or a combination thereof, or an ether (—O—), $L_1$ and $L_2$ are the same or different, and are each independently a substituted or unsubstituted C2 to C5 oxyalkylene, m and n are an integer of 0 to 20, provided that they are not simultaneously 0, $L_3$ and $L_4$ are each independently the same or different, and are a direct bond, —O—$(CH_2)_n$—CH(OH)—$CH_2$—, or —$(CH_2)_n$—CH(OH)—$CH_2$—, wherein n is an integer of 0 to 5, and $R^1$ and $R^2$ are the same or different, and are each independently $CR_2$=CR— (wherein, R is hydrogen or a methyl group) or $CR_2$=CRCO— (wherein, R is hydrogen or a methyl group).

Types of the main monomer are not particularly limited but may include a (C1 to C6 alkyl) (meth)acrylate, ethylene glycol di(meth)acrylate, triethylene glycol di(meth)acrylate, diethylene glycol di(meth)acrylate, 1,4-butanediol di(meth)acrylate, 1,6-hexanediol di(meth)acrylate, neopentyl glycol di(meth)acrylate, pentaerythritol di(meth)acrylate, pentaerythritol tri(meth)acrylate, pentaerythritol tetra(meth)acrylate, di pentaerythritol di(meth)acrylate, dipentaerythritol tri(meth)acrylate, dipentaerythritol penta(meth)acrylate, pentaerythritol hexa(meth)acrylate, trimethylol propane tri (meth)acrylate, ethylene glycol monomethyl ether (meth)acrylate, novolac epoxy (meth)acrylate, diethylene glycol di(meth)acrylate, triethylene glycol di(meth)acrylate, propylene glycol di(meth)acrylate, tris(meth)acryloyloxyethyl phosphate, or a combination thereof, but it is not limited thereto.

The quantum dot polymer composite including the first accessory monomer and/or the second accessory monomer may show improved developability and improved linearity during a patterning process even when the composition includes a large amount of quantum dots and/or an inorganic light diffusing agent.

The first accessory monomer may have at least 8, for example, at least 10, or at least 12 carbon-carbon double bonds (e.g., (meth)acrylate groups). The number of carbon-carbon double bonds of the first accessory monomer may be less than or equal to about 20. Without being bound by any theory, the introduction of the first accessory monomer increases the number of cross-linkable functional groups, and these functional groups may participate in a cross-linking reaction, thereby the composite may have greater density, and thus, the linearity of the resulting pattern may be improved.

The first accessory monomer may include a hyperbranched (meth)acrylate-based monomer. The hyperbranched monomer may have a regularly branched structure such as a dendrimer. In an embodiment, the hyperbranched monomer may have an incompletely branched or irregular structure. The first accessory monomer may further include at least one (for example, one to four) hydroxy groups, and the density and the developability of the patterned composite may be improved together. The first accessory monomer may be used alone or as a mixture of at least two compounds.

A weight average molecular weight of the first accessory monomer may be greater than or equal to about 300 grams per mole (g/mol) to 10,000 g/mol, for example, from about 500 g/mol to about 800 g/mol.

The first accessory monomer may be synthesized by a known method or is commercially available (e.g., from Shin Nakamura Chemical Co., Ltd. or Nippon Kayaku Co., Ltd.).

The second accessory monomer may be represented by Chemical Formula E. For example, the second accessory monomer may be represented by one of Chemical Formula E-1 and Chemical Formula E-2:

Chemical Formula E-1

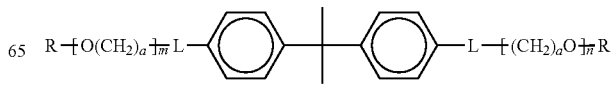

-continued

Chemical Formula E-2

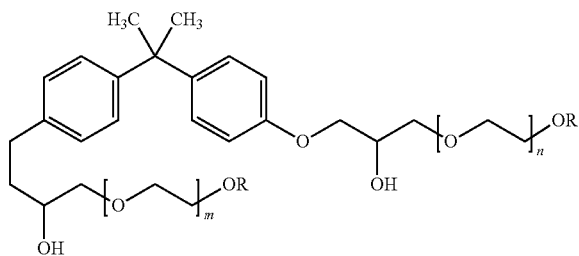

wherein,

R is the same or different, and are each independently —COCR=CR² (R is hydrogen or a methyl group), a is an integer of 1 to 5, m and n are the same as defined in Chemical Formula E, and L is the same or different, and is independently a direct bond, C1 to C10 alkylene, or an ether (—O—).

In an exemplary embodiment, the second accessory monomer may include bisphenol A di(meth)acrylate, bisphenol A epoxy (meth)acrylate, bisphenol A ethylene glycol di(meth)acrylate, bisphenol A ethoxylate di(meth)acrylate, poly(ethylene glycol) reacted with bisphenol A glycidyl ether, or a combination thereof.

A weight average molecular weight of the second accessory monomer may be greater than or equal to about 300 g/mol, for example, from about 300 g/mol to about 10,000 g/mol, or from about 700 g/mol to about 1500 g/mol.

When the composition includes a mixture of the photopolymerizable monomers, an amount of the main monomer may be greater than or equal to about 60 wt %, for example, greater than or equal to about 65 wt %, based on the total weight of the mixture of the photopolymerizable monomers. An amount of the main monomer may be less than or equal to about 90 wt %, for example, less than or equal to about 85 wt %, based on the total weight of the mixture of the photopolymerizable monomers.

In the photopolymerizable monomer composition, the sum of the first accessory monomer and the second accessory monomer may be greater than or equal to about 10 wt %, for example, greater than or equal to about 15 wt %, based on the total weight of the mixture of the photopolymerizable monomers. In the photopolymerizable monomer composition, the sum of the first accessory monomer and the second accessory monomer may be less than or equal to about 40 wt %, for example, less than or equal to about 35 wt %, based on the total weight of the mixture of the photopolymerizable monomers.

When being used, the amount ratio (e.g., the weight ratio) between the first accessory monomer and the second accessory monomer (the amount of the first accessory monomer : the amount of the second accessory monomer) is about 1:0.1 to 1:10, for example, 1:0.2 to 1:5, 1:0.25 to 1:4, 1: 0.5 to 1:2, 1:0.7 to 1:1.3, or 1:0.75 to 1:1.2. In other embodiments, the amount of the first accessory monomer is the same or greater than that of the second accessory monomer, but it is not limited thereto.

In the photosensitive composition, the amount of the photopolymerizable monomer may be greater than or equal to about 0.5 wt %, for example, greater than or equal to about 1 wt %, or greater than or equal to about 2 wt % with respect to a total amount of the composition. The amount of the photopolymerizable monomer may be less than or equal to about 70 wt %, for example less than or equal to about 65 wt %, less than or equal to about 60 wt %, less than or equal to about 55 wt %, less than or equal to about 50 wt %, less than or equal to about 45 wt %, less than or equal to about 40 wt %, less than or equal to about 35 wt %, less than or equal to about 30 wt %, less than or equal to about 25 wt %, less than or equal to about 20 wt %, less than or equal to about 19 wt %, less than or equal to about 18 wt %, less than or equal to about 17 wt %, less than or equal to about 16 wt %, or less than or equal to about 15 wt %.

If desired, the composition may further include various additives such as a light diffusing agent, a leveling agent, or a coupling agent, in addition to the aforementioned components. The amount of the additive is not particularly limited, and may be selected within an appropriate range, wherein the additive does not cause an adverse effect on the preparation of the composition, the preparation of the quantum dot polymer composite, and optionally, the patterning of the composite.

The light diffusing agent may increase a refractive index of the composition in order to increase a chance of the incident light to meet with quantum dots. The light diffusing agent may include inorganic oxide particles such as alumina, silica, zirconia, titanium oxide particulates, or zinc oxide, and metal particles such as gold, silver, copper, or platinum, but is not limited thereto.

The leveling agent is aimed to prevent stains or spots and to improve planarization and leveling characteristics of a film, and examples thereof may include the following but are not limited thereto. For example, a fluorine-containing leveling agent may include commercial products, for example BM-1000® and BM-1100® of BM Chemie Inc.; MEGAFACE F 142D®, F 172®, F 173®,and F 183® of Dainippon Ink Kagaku Kogyo Co., Ltd.; FC-135®, FC-170C®, FC-430®, and FC-431® of Sumitomo 3M Co., Ltd.; SURFLON S-112®, SURFLON S-113®, SURFLON S-131®, SURFLON S-141®, and SURFLON S-145® of Asahi Glass Co., Ltd.; and SH-28PA®, SH-190®, SH-193®, SZ-6032®, SF-8428®, and the like of Toray Silicone Co., Ltd.

The coupling agent is aimed to increase adhesion with respect to the substrate, and examples thereof may include a silane coupling agent. Examples of the silane coupling agent may be vinyl trimethoxysilane, vinyl tris(2-m ethoxyethoxysilan e), 3-glycidoxypropyltrimethoxysilane, 2-(3,4-epoxycyclohexyl) ethyltrimethoxysilane, 3-chloropropylmethyldimethoxysilane, 3-chloropropyltrimethoxysilane, 3-methacryloxylpropyltrimethoxysilane, 3-mercaptopropyltrimethoxysilane, and the like. Types and the amounts of the additives may be adjusted, if desired.

If present, the amount of the additives may be greater than or equal to about 0.1 wt %, for example, greater than or equal to about 0.5 wt %, greater than or equal to about 1 wt %, greater than or equal to about 2 wt %, or greater than or equal to about 5 wt %, but it is not limited thereto. If present, the amount of the additives may be less than or equal to about 20 wt %, for example, less than or equal to about 19 wt %, less than or equal to about 18 wt %, less than or equal to about 17 wt %, less than or equal to about 16 wt %, or less than or equal to about 15 wt %, but it is not limited thereto.

The composition of the embodiments may be prepared by a method that includes:

preparing a quantum dot binder dispersion including the plurality of quantum dots, the binder polymer (e.g., containing the carboxylic acid group (COOH)), the polyvalent metal compound, and an organic solvent; and mixing the quantum dot binder dispersion with a photoinitiator, the photopolymerizable monomer (e.g., (meth)

acrylate monomer), the thiol compound, and optionally, at least one of the foregoing additives.

The quantum dot binder dispersion may be prepared by mixing a solution of the binder polymer and a quantum dot solution. The polyvalent metal compound may be dissolved in a solvent that is miscible with the organic solvent and then mixed with other components.

Details of the binder polymer, the quantum dots, the photopolymerizable monomer, the thiol compound, and the additives are the same as set forth above.

Types of the solvent included in the composition are not particularly limited. Types and the amount of the solvent may be determined depending on the types and the amounts of the foregoing main components (i.e., the quantum dots, the COOH group-containing binder, the thiol compound, the photopolymerizable monomer combination, and the photoinitiator), and other additives. The composition may include the solvent in such an amount that the remaining amount of the composition other than the amounts of the solid (i.e., non-volatiles) components is the amount of the solvent. The solvent may be selected appropriately considering its affinity for other components (e.g., the binder, the photopolymerizable monomer, the photoinitiator, and other additives), its affinity for the alkali developing solution, and its boiling point.

Examples of the solvent may be:

ethyl 3-ethoxy propionate;

an ethylene glycol such as ethylene glycol, diethylene glycol, or polyethylene glycol;

a glycol ether such as ethylene glycol monomethyl ether, ethylene glycol monoethyl ether, diethylene glycol monomethyl ether, ethylene glycol diethyl ether, and diethylene glycol dimethyl ether;

glycol ether acetates such as ethylene glycol acetate, ethylene glycol monoethyl ether acetate, diethylene glycol monoethyl ether acetate, and diethylene glycol monobutyl ether acetate;

a propylene glycol such as propylene glycol;

propylene glycol ethers such as propylene glycol monomethyl ether, propylene glycol monoethyl ether, propylene glycol monopropyl ether, propylene glycol monobutyl ether, propylene glycol dimethyl ether, dipropylene glycol dimethyl ether, propylene glycol diethyl ether, and dipropylene glycol diethyl ether;

propylene glycol ether acetates such as propylene glycol monomethyl ether acetate (PGMEA) and dipropylene glycol monoethyl ether acetate;

amides such as N-methylpyrrolidone, dimethyl formamide, and dimethyl acetam ide;

ketones such as methyl ethyl ketone (MEK), methyl isobutyl ketone (MIBK), and cyclohexanone;

petroleum products such as toluene, xylene, and solvent naphtha;

esters such as ethyl acetate, butyl acetate, and ethyl lactate;

ethers such as diethyl ether, dipropyl ether, and dibutyl ether; and any combinations thereof.

The photoinitiator included in the composition is a compound capable of initiating a radical polymerization of the photopolymerizable monomer (e.g., acyclic monomer) and/ or the thiol compound. Types of the photoinitiator are not particularly limited. For example, the available photopolymerization initiator may include a triazine compound, an acetophenone compound, a benzophenone compound, a thioxanthone compound, a benzoin compound, an oxime compound, an aminoketone compound, a phosphine or phosphine oxide compound, a carbazole compound, a diketone compound, a sulfonium borate compound, a diazo compound, a diimidiazole compound, or a combination thereof, but it is not limited thereto.

In a non-limiting example, the examples of the triazine compound may include 2,4,6-trichloro-s-triazine, 2-phenyl-4,6-bis(trichloromethyl)-s-triazine, 2-(3', 4'-dimethoxystyryl)-4,6-bis(trichloromethyl)-s-triazine, 2-(4'-methoxynaphthyl)-4,6-bis (trichloromethyl)-s-triazine, 2-(p-methoxy phenyl)-4,6-bis (trichloromethyl)-s-triazine, 2-(p-tolyl)-4,6-bis(trichloromethyl)-s-triazine, 2-biphenyl-4,6-bis (trichloromethyl)-s-triazine, 2,4-bis(trichloromethyl)-6-styryl-s-triazine, 2-(naphth-1-yl)-4,6-bis(trichloromethyl)-s-triazine, 2-(4-methoxynaphth-1-yl)-4,6-bis (trichloromethyl)-s-triazine, 2,4-trichloromethyl(piperonyl)-6-triazine, and 2,4-trichloromethyl (4'-methoxy styryl)-6-triazine, but are not limited thereto.

Examples of the acetophenone compound may be 2,2'-diethoxyacetophenone, 2,2'-dibutoxyacetophenone, 2-hydroxy-2-methylpropinophenone, p-t-butyltrichloroacetophenone, p-t-butyldichloro acetophenone, 4-chloroacetophenone, 2,2'-dichloro-4-phenoxyacetophenone, 2-methyl-1-(4-(methylthio)phenyl)-2-morpholinopropan-1-one, 2-benzyl-2-dimethylamino-1-(4-morpholinophenyl)-butan-1-one, and the like, but are not limited thereto.

Examples of the benzophenone compound may be benzophenone, benzoyl benzoate, benzoyl methyl benzoate, 4-phenylbenzophenone, hydroxybenzophenone, acrylated benzophenone, 4,4'-bis(dimethylamino)benzophenone, 4,4'-dichlorobenzophenone, 3,3'-dimethyl-2-methoxybenzophenone, and the like, but are not limited thereto.

Examples of the thioxanthone compound may be thioxanthone, 2-methylthioxanthone, 2-isopropylthioxanthone, 2,4-diethylthioxanthone, 2,4-diisopropylthioxanthone, 2-chlorothioxanthone, and the like, but are not limited thereto.

Examples of the benzoin compound may include benzoin, benzoin methyl ether, benzoin ethyl ether, benzoin isopropyl ether, benzoin isobutyl ether, benzyl dimethyl ketal, and the like, but are not limited thereto.

Examples of the oxime compound may be 2-(o-benzoyloxime)-1-[4-(phenylthio) phenyl]-1,2-octandione, 1-(o-acetyloxime)-1[9-ethyl-6-(2-methylbenzoyl)-9H-carbazol-3-yl]ethanone, and the like, but are not limited thereto.

In the composition, an amount of the photoinitiator may be greater than or equal to about 0.01 wt %, for example, greater than or equal to about 0.1 wt %, or greater than or equal to about 1 wt %, based on the total weight of the composition. The amount of the photoinitiator may be less than or equal to about 10 wt %, for example, less than or equal to about 5 wt %, based on the total weight of the composition. In an embodiment, the amount of the photoinitiator may be about 0.05 to about 10 wt %, based on the total weight of solids (i.e., non-volatiles) of the composition. While not wishing to be bound by theory, it is understood that within the aforementioned ranges, a desirable pattern may be formed.

The foregoing components may be mixed in any order or simultaneously.

The preparation method of the composition may include selecting the quantum dots that may have an organic ligand with a hydrophobic moiety on a surface thereof and selecting a binder polymer (containing the carboxylic acid) capable of dispersing the quantum dots. The selecting the binder polymer may be made considering the chemical structure and the acid value of the binder polymer.

The composition may be developable with an alkaline aqueous solution, and thus, a quantum dot-polymer composite pattern may be patterned from the photosensitive composition without using an organic solvent developing solution. The patterning process using the composition of the embodiments may adopt a photolithography process using conventional photoresist.

For example, the composition may be coated on a predetermined substrate (e.g., a glass substrate or a glass substrate coated with a predetermined thickness of $SiN_x$ (protective layer) (e.g., 500 to 1,500 Angstroms (Å) of the protective layer)) in an appropriate manner such as spin coating, slit coating, and the like to form a film of a predetermined thickness (e.g., a thickness of 3 to 30 micrometers, μm). The formed film may be pre-baked, if desired. The specific conditions of pre-baking such as temperature, time, and atmosphere are known in the art and may be appropriately selected.

The formed (or optionally, pre-baked) film is exposed to light of a predetermined wavelength under a mask having a predetermined pattern. The wavelength and the intensity of light may be selected depending on the types and the amounts of the photoinitiator, the types and the amounts of quantum dots, or the like.

The exposed film is treated with an alkali developing solution, and thereby the unexposed region in the film is dissolved to provide a desirable pattern. The obtained pattern may be post-baked, if desired, to improve crack resistance and solvent resistance of the pattern, for example, at a temperature of about 150° C. to about 230° C. for a predetermined time (e.g., greater than or equal to about 10 min or greater than or equal to about 20 min).

In some non-limiting embodiments using a quantum dot-polymer composite obtained from the photosensitive composition as a color filter, two or three types of photosensitive compositions each including red quantum dots, green quantum dots, (or optionally, blue quantum dots) may be prepared, and the patterning process may be repeated as many times as necessary (e.g., two times or three times) for each composition to provide a quantum dot-polymer composite having a desirable pattern.

Another embodiment provides a quantum dot-polymer composite, which includes:

a polymer matrix including a binder polymer having a carboxylate group (COO—) and a carboxyl (—COON) group, a polymerization product, a thiol-derived moiety, and a polyvalent metal ion; and a plurality of quantum dots that are dispersed in the polymer matrix;

wherein the quantum dot includes an organic ligand on a surface thereof, wherein the polymerization product includes a polymerized product of a photopolymerizable monomer, a polymerized product of a thiol compound having at least two thiol groups at its terminal ends, or a combination thereof, and wherein the polymer matrix includes an ionic crosslinking bond between the carboxylate moiety and the polyvalent metal ion.

The thiol moiety of the thiol compound may be linked to the surface of the quantum dot and thereby at least two quantum dots may be linked to each other via the thiol compound.

In some embodiments, the quantum dot polymer composite may be prepared by the foregoing composition. Thus, details of the quantum dots, the thiol compound, the polyvalent metal compound, the binder polymer, the photopolymerizable monomer, and the like are the same as set forth above. The quantum dot polymer composite may exhibit enhanced stability (e.g., improved heat stability), and thus, even when the composite is subjected to heating of 180° C. for 30 mins, a conversion efficiency thereof may be greater than or equal to about 68%, for example, greater than or equal to about 69%, or greater than or equal to about 70% of its initial photoconversion efficiency.

The absolute quantum yield (Abs. QY) of the quantum dot polymer composite may be greater than or equal to about 60%.

In the quantum dot polymer composite, the amount of the quantum dot may be greater than or equal to about 1 wt %, for example, 2 wt %, greater than or equal to about 3 wt %, greater than or equal to about 4 wt %, or greater than or equal to about 5 wt %, based on a total weight of the composite, but it is not limited thereto. In the quantum dot polymer composite, the amount of the quantum dot may be less than or equal to about 70 wt %, for example, less than or equal to about 65 wt %, less than or equal to about 60 wt %, less than or equal to about 55 wt %, less than or equal to about 50 wt %, less than or equal to about 45 wt %, or less than or equal to about 40 wt %, based on a total weight of the composite, but it is not limited thereto.

In the quantum dot polymer composite, the amount of the binder polymer may be greater than or equal to about 0.5 wt %, for example, greater than or equal to about 1 wt %, greater than or equal to about 2 wt %, greater than or equal to about 3 wt %, greater than or equal to about 4 wt %, or greater than or equal to about 5 wt %, based on a total weight of the composite, but it is not limited thereto. In the quantum dot polymer composite, the amount of the binder polymer may be less than or equal to about 70 wt %, for example, less than or equal to about 65 wt %, less than or equal to about 60 wt %, less than or equal to about 55 wt %, less than or equal to about 50 wt %, less than or equal to about 45 wt %, less than or equal to about 40 wt %, or less than or equal to about 35 wt %, based on a total weight of the composite, but it is not limited thereto.

In the quantum dot polymer composite, the amount of the polymerization product (except for the moiety derived from the thiol) may be greater than or equal to about 0.5 wt %, for example, greater than or equal to about 1 wt %, greater than or equal to about 2 wt %, or greater than or equal to about 3 wt %, based on a total weight of the composite, but it is not limited thereto. In the quantum dot polymer composite, the amount of the polymerization product (except for the moiety derived from the thiol) may be less than or equal to about 70 wt %, for example, less than or equal to about 65 wt %, less than or equal to about 60 wt %, less than or equal to about 55 wt %, less than or equal to about 50 wt %, less than or equal to about 45 wt %, less than or equal to about 40 wt %, less than or equal to about 35 wt %, less than or equal to about 30 wt %, less than or equal to about 25 wt %, or less than or equal to about 20 wt %, based on a total weight of the composite, but it is not limited thereto.

In the quantum dot polymer composite, the amount of the moiety derived from the thiol may be greater than or equal to about 0.1 wt %, for example, greater than or equal to about 0.5 wt %, greater than or equal to about 1 wt %, greater than or equal to about 2 wt %, or greater than or equal to about 3 wt %, based on a total weight of the composite, but it is not limited thereto. In the quantum dot polymer composite, the amount of the moiety derived from the thiol may be less than or equal to about 55 wt %, for example, less than or equal to about 50 wt %, less than or equal to about 45 wt %, less than or equal to about 40 wt %, or less than or equal to about 35 wt %, less than or equal to about 30 wt %, less than or equal to about 25 wt %, less than or equal to about 20 wt %, less than or equal to about 15 wt %, less than or equal to about 14 wt %, less than or equal to about 13 wt %, less than or equal to about 12 wt %, less than or equal to about 11 wt %, or less than or equal to about 10 wt %, based on a total weight of the composite, but it is not limited thereto.

In the quantum dot polymer composite, the amount of the polyvalent metal compound may be greater than or equal to about 0.01 wt %, for example, greater than or equal to about 0.1 wt %, greater than or equal to about 0.5 wt %, or greater than or equal to about 1 wt %, based on a total weight of the composite, but it is not limited thereto. In the quantum dot polymer composite, the amount of the polyvalent metal compound may be less than or equal to about 10 wt %, for example, less than or equal to about 9 wt %, less than or equal to about 8 wt %, less than or equal to about 7 wt %, less than or equal to about 6 wt %, or less than or equal to about 5 wt %, based on a total weight of the composite, but it is not limited thereto.

The quantum dot polymer composite may further include at least one of the foregoing additives. For example, in the quantum dot polymer composite, the amount of the additives such as the light diffusing agent may be greater than or equal to 0.1 wt %, for example, greater than or equal to about 0.5 wt %, greater than or equal to about 1 wt %, greater than or equal to about 2 wt %, or greater than or equal to about 5 wt %, based on a total weight of the composite. In some embodiments, the quantum dot polymer composite may include the additive such as the light diffusing agent in an amount of less than or equal to about 25 wt %, for example, less than or equal to about 20 wt %, less than or equal to about 19 wt %, less than or equal to about 18 wt %, less than or equal to about 17 wt %, less than or equal to about 16 wt %, or less than or equal to about 15 wt %, based on a total weight of the composite, but it is not limited thereto.

Other embodiments provide an electronic device including the foregoing quantum dot polymer composite. The electronic device may include a light emitting diode (LED), an organic light emitting diode (OLED), a sensor, a solar cell device, imaging sensor, or a liquid crystal display device, but it is not limited thereto. The quantum dot polymer composite may include a repeating pattern including a plurality of sections of at least two different colors (e.g., RGB sections). The pattern of the quantum dot polymer composite may replace an absorption type color filter in a liquid crystal display and find its utility in a photoluminescent color filter.

In some non-limiting embodiments, a schematic layered structure of a liquid crystal display device including the quantum dot sheet is shown in FIG. 1. A general structure of the LCD are known in the art and FIG. 1 schematically shows the same.

Referring to FIG. 1, the liquid crystal display may include a reflector, a light guide panel, a Blue LED, a quantum dot polymer composite sheet, various optical sheets such as a prism sheet, a double brightness enhance film (DBEF), which are layered to form a layered structure, and a liquid crystal panel may be disposed on the top of the layered structure.

Hereinafter, the embodiments are illustrated in more detail with reference to examples. However, the present disclosure is not limited thereto.

EXAMPLES

Analysis Method

[1] Photoluminescence Analysis such as Quantum Efficiency and the like
A Hitachi F-7000 spectrometer is used to perform a photoluminescence spectrum analysis with irradiation light of 458 nanometers (nm) (532 nm for red QD). The photoluminescence spectrum of the quantum dots is obtained.

[2] UV spectroscopy analysis
A Hitachi U-3310 spectrometer is used to perform a UV spectroscopy analysis to obtain a UV-visible absorption spectrum.

[3] Microscopic Analysis
A ECLIPS 100D, NICON microscope is used to analyze a surface of the obtained composite by a Dark Field microscopy and a Fluorescence microscopy.

[4] Infra-Red Spectroscopic Analysis
A Varian 670 IR spectrometer with Miracle ATR accessory is used to conduct an IR Spectroscopic Analysis.

[5] Absolute quantum yield of the quantum dot polymer composite
A quantum dot polymer composite film is placed in an integrating sphere and a blue light source is applied. An absolute quantum yield is calculated from a ratio between the number of the photons supplied to the quantum dot and the number of the photons emitted from the quantum dots.

Preparation of Core-Shell Quantum Dots

Red light emitting quantum dots and Green light emitting quantum dots are prepared in accordance with the following procedure.

Reference Example: Production of Red or Green light emitting quantum dots (1) 0.2 millimoles (mmol) of indium acetate, 0.6 mmol of palmitic acid, and 10 milliliters (mL) of 1-octadecene are placed in a flask, subjected to a vacuum state at 120° C. for one hour, and heated to 280° C. after the atmosphere in the flask is exchanged with N2. Then, a mixed solution of 0.1 mmol of tris(trimethylsilyl)phosphine (TMS$_3$P) and 0.5 mL of trioctylphosphine (TOP) is quickly injected, and the reaction proceeds for a predetermined time (e.g., for 20 minutes). The reaction mixture then is rapidly cooled and acetone is added thereto to produce nanocrystals, which are then separated by centrifugation and dispersed in toluene. The first absorption maximum in UV-VIS spectrum of the InP core nanocrystals, thus prepared, may be in the range of 420 to 600 nm.

0.3 mmol (0.056 grams, g) of zinc acetate, 0.6 mmol (0.189 g) of oleic acid, and 10 mL of trioctylamine are placed in a flask, subjected to a vacuum state at 120° C. for 10 minutes, and then heated to 220° C. after the atmosphere in the flask is exchanged with N2. Then, a toluene dispersion of the InP core nanocrystals prepared above (optical density: 0.15) and 0.6 mmol S/TOP sulfur dissolved or dispersed in the sulfur) are added to the flask, and then, the resulting mixture is heated to 280° C., while the reaction proceeds for 30 minutes. After the reaction, the reaction solution is quickly cooled to room temperature to obtain a reaction mixture including InP/ZnS semiconductor nanocrystals.

(2) An excess amount of ethanol is added to the reaction mixture including the InP/ZnS semiconductor nanocrystals, which is then centrifuged to remove an extra organic material from the reaction mixture of the semiconductor nanocrystals. After centrifugation, the supernatant is discarded and the precipitate is dried and dispersed in chloroform. A UV-vis absorption spectrum of the resulting dispersion is measured. The prepared semiconductor nanocrystals emit green or red light.

Preparation of Composition and Composites

Example 1

[1] Preparation of quantum dot-binder dispersion

A chloroform dispersion of green light emitting quantum dots including oleic acid as a hydrophobic organic ligand bonded to a surface thereof is prepared.

In a solution of a binder polymer of a four membered copolymer of methacrylic acid, benzyl methacrylate, hydroxyethyl methacrylate, and styrene, acid value: 130 milligrams (mg) per gram of KOH (mg KOH/g), molecular weight: 8,000, acrylic acid : benzyl methacrylate : hydroxyethyl methacrylate : styrene (molar ratio)=61.5%:12%: 16.3%:10.2%) (polypropylene glycol monomethyl ether acetate having a concentration of 30 percent by weight, wt %), $ZnCl_2$ is dissolved to provide a binder polymer—$ZnCl_2$ solution.

The chloroform dispersion including the quantum dots is mixed with binder polymer—$ZnCl_2$ solution to form a quantum dot-binder dispersion.

[2] Preparation of the photosensitive composition To the quantum dot-binder dispersion prepared in item [1], glycol di-3-mercaptopropionate (hereinafter, 2T) having the following structure, hexaacrylate having the following structure (as a photopolymerizable monomer), an oxime ester compound (as an initiator), $TiO_2$ (as a light diffusing agent), and PGMEA (as a solvent) are added to obtain a composition.

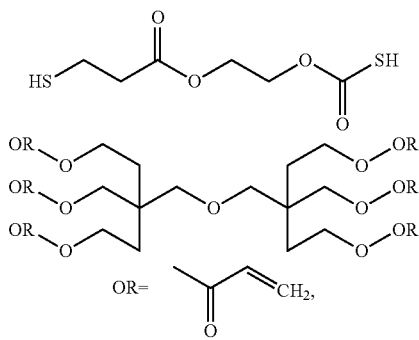

The prepared compositions includes 12 wt % of quantum dots, 28 wt % of the binder polymer, 4.5 wt % of the thiol compound, 0.9 wt % of the polyvalent metal compound, 2 wt % of the photopolymerizable monomer, and 0.1 wt % of the photoinitiator, 3 wt % of the light diffusing agent, and a balance amount of the solvent, based on a total weight of the composition.

It is confirmed that the composition, thus prepared, may form a dispersion without showing any noticeable agglomeration due to the addition of the quantum dots.

[3] Formation of quantum dot—polymer composite

The composition obtained from item [2] is spin-coated on a glass substrate at 150 revolutions per minute (rpm) for 5 seconds (s) to provide a film. The obtained film is pre-baked at 100° C. for 2 minutes (min). For the pre-baked film, a photoconversion efficiency is measured, and the results are shown in Table 1. The pre-baked film is exposed to light (wavelength: 365 nanometers (nm), intensity: 60 millijoules, mJ) for 1 s (EXP) to conduct a polymerization.

[4] Evaluation of the luminous stability on the post bake treatment

The exposed film is heated at 180° C. for 30 minutes (FOB). The photoconversion efficiency at the PRB, the EXP and the FOB are measured respectively, and the results are shown in Table 1 and FIG. 2.

Figure 2:
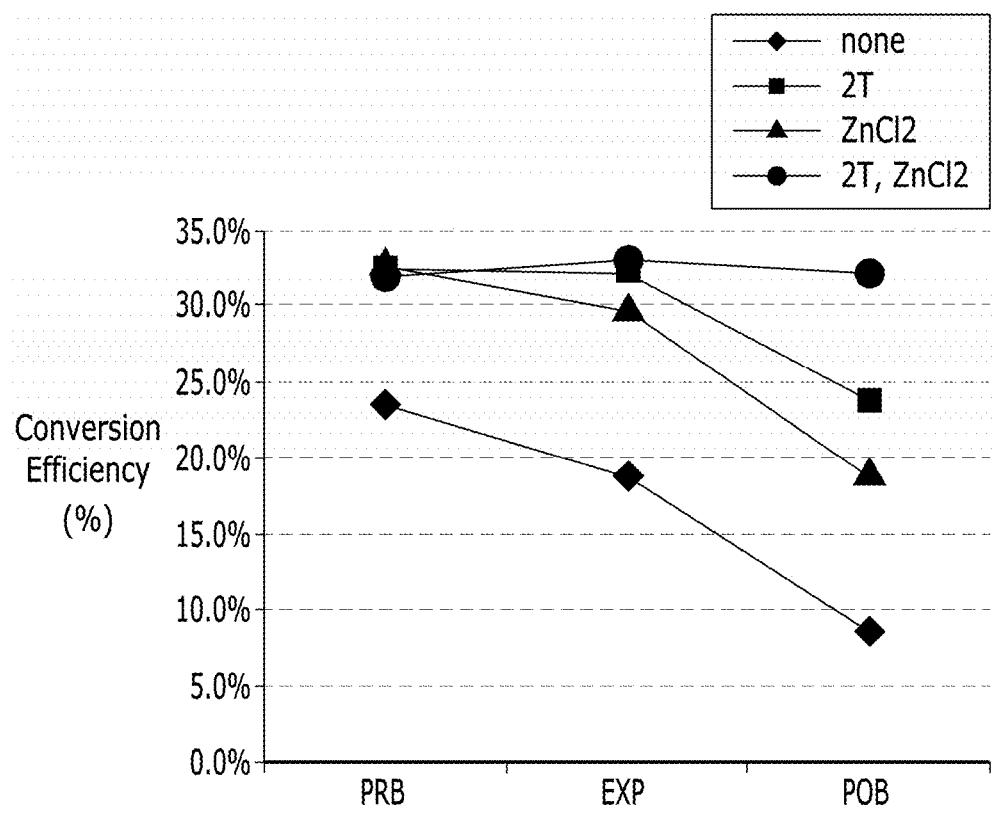
FIG. 2 is a graph showing a change in a photoconversion efficiency over the processes for preparing each of the composites in Example 1 and Comparative Example.
Figure 3:
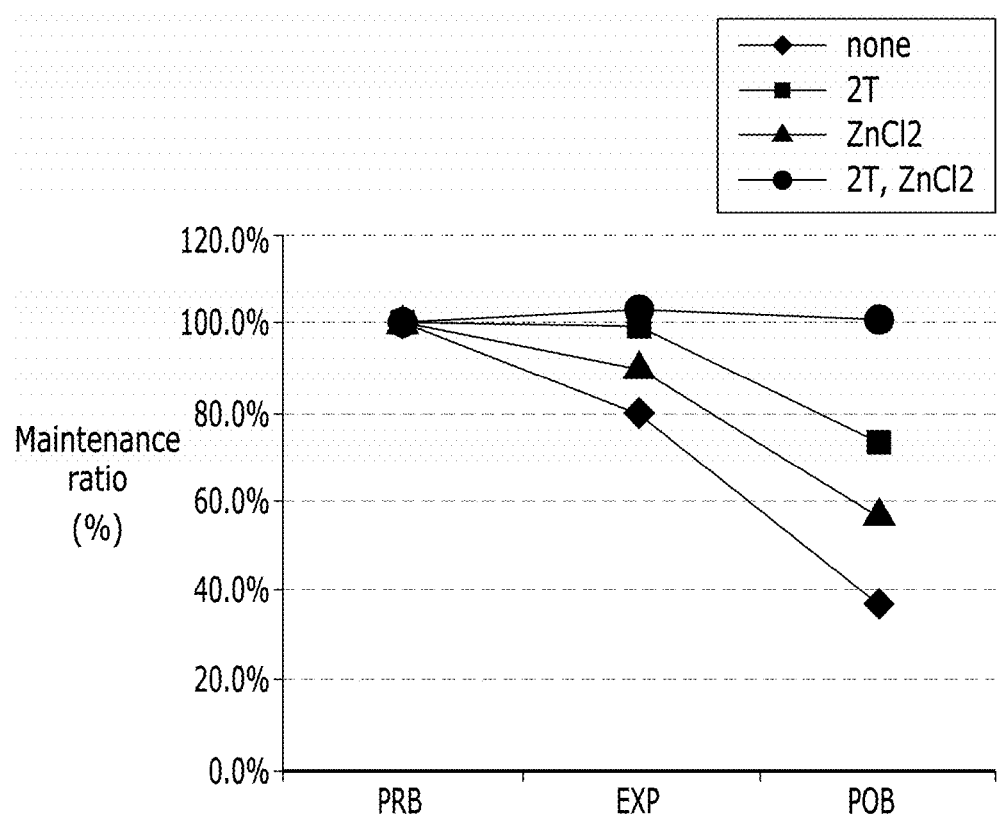
FIG. 3 is a graph of a maintenance rate of the photoconversion efficiency over the process of preparing each of the composites in Example 1 and Comparative Example.

Using the data of Table 1 and FIG. 2, the maintenance rate of the photoconversion efficiency is calculated, and the results are compiled in Table 2 and FIG. 3.

Comparative Example 1

A composition and a quantum dot polymer composite are prepared in the same manner as in Example 1 except for not using the thiol compound and $ZnCl_2$.

The photoconversion efficiency at the PRB, the EXP and the FOB are measured respectively, and the results are shown in Table 1 and FIG. 2.

Using the data of Table 1 and FIG. 2, the maintenance rate of the photoconversion efficiency is calculated, and the results are compiled in Table 2 and FIG. 3.

Comparative Example 2

A composition and a quantum dot polymer composite are prepared in the same manner as in Example 1 except for not using $ZnCl_2$.

The photoconversion efficiency at the PRB, the EXP and the FOB are measured respectively, and the results are shown in Table 1 and FIG. 2.

Using the data of Table 1 and FIG. 2, the maintenance rate of the photoconversion efficiency is calculated, and the results are compiled in Table 2 and FIG. 3.

Comparative Example 3

A composition and a quantum dot polymer composite are prepared in the same manner as in Example 1 except for not using the thiol compound.

The photoconversion efficiency at the PRB, the EXP and the FOB are measured respectively, and the results are shown in Table 1 and FIG. 2.

Using the data of Table 1 and FIG. 2, the maintenance rate of the photoconversion efficiency is calculated, and the results are compiled in Table 2 and FIG. 3.

TABLE 1

| Photoconversion Efficiency (PCE) | C.E. 1 (without using 2T and $ZnCl_2$) | C.E. 2 (with using 2T) | C.E. 3 (with using $ZnCl_2$) | Example 1 Using 2T, $ZnCl_2$ |
|---|---|---|---|---|
| PRB | 23.7% | 32.6% | 33.2% | 32.0% |
| EXP | 18.9% | 32.4% | 30.0% | 33.0% |
| POB | 8.7% | 23.9% | 19.2% | 32.3% |

TABLE 2

| Maintenance rate of PCE | C.E. 1 (without using 2T and ZnCl$_2$) | C.E. 2 (with using 2T) | C.E. 3 (with using ZnCl$_2$) | Example 1 Using 2T, ZnCl$_2$ |
|---|---|---|---|---|
| PRB | 100.0% | 100.0% | 100.0% | 100.0% |
| EXP | 79.8% | 99.3% | 90.4% | 103.1% |
| POB | 36.8% | 73.3% | 57.9% | 100.9% |

In Tables 1-2, "C.E." refers to "Comparative Example".

From the foregoing results, the composite of Example 1 may show an increased value of the PCE maintenance rate in comparison with the composite of Comparison Examples.

Without wishing to be bound by any theory, the thiol compound in the composite of Example 1 may increase the crosslinking density in the main matrix polymer and may result in a surface ligand exchange of the quantum dots in the presence of the metal salt compound, thereby leading to the formation of the linkage between the quantum dots via the thiol (i.e., the QD-Thiol-QD linkage). In addition, the metal salt compound may react with the carboxylic acid group of the binder to form an ionic crosslinking in the main matrix. As a result, the composite, thus prepared, may exhibit improved luminous properties (e.g., improved stability) even after a harsh heat treatment process.

Examples 2-1 and 2-2 and Comparative Example 4

A composition and a quantum dot polymer composite are prepared in the same manner as in Example 1 except for using green light emitting quantum dots and changing the amount of the ZnCl$_2$ into 1.5 wt % (based on the solid content, Example 2-1), 2.5 wt % (based on the solid content, Example 2-2), and 0 wt % (Comparative Example 4), respectively.

Figure 4:
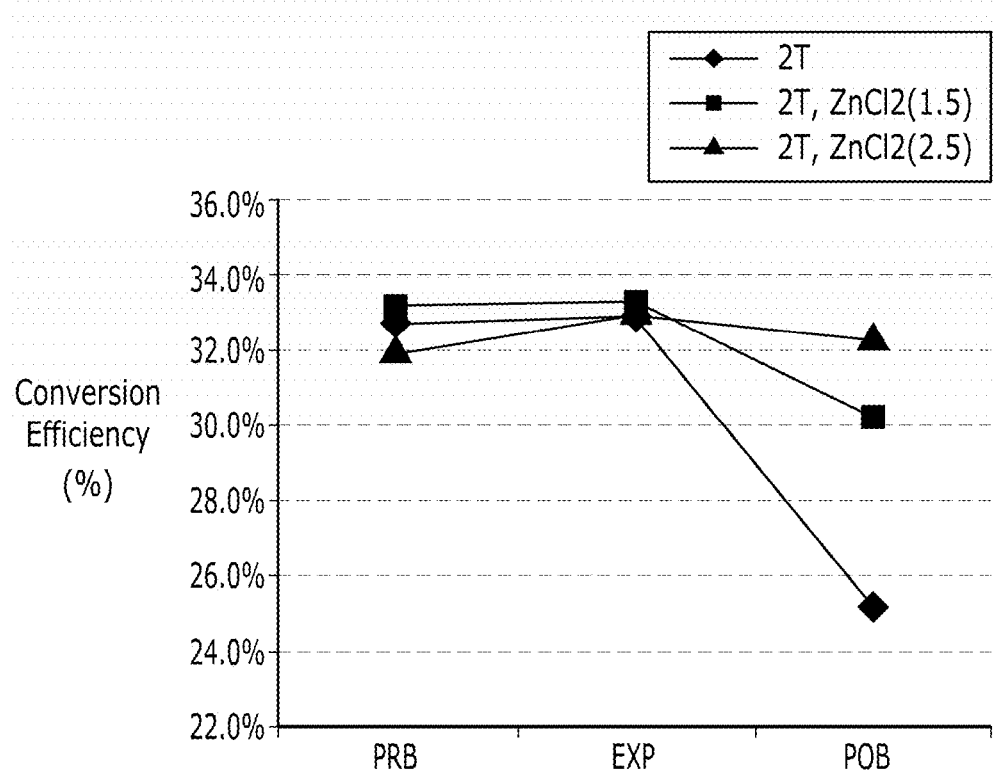
FIG. 4 is a graph showing a change in a photoconversion efficiency over the processes for preparing each of the composites in Example 2 and Comparative Example.

The photoconversion efficiency at the PRB, the EXP and the FOB are measured respectively, and the results are shown in Table 3 and FIG. 4.

Figure 5:
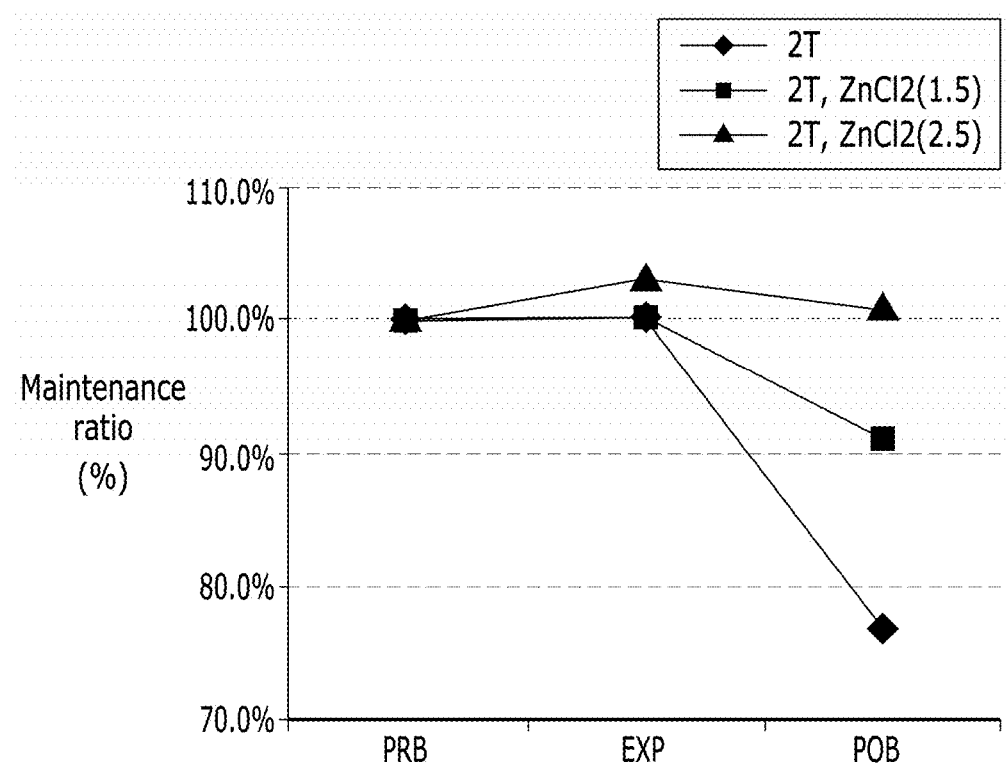
FIG. 5 is a graph of a maintenance rate of the photoconversion efficiency over the process of preparing each of the composites in Example 2 and Comparative Example.

Using the data of Table 3 and FIG. 4, the maintenance rate of the photoconversion efficiency is calculated, and the results are compiled in Table 4 and FIG. 5.

TABLE 3

| Photoconversion Efficiency (PCE) | C.E. 4 (using 2T) | Example 2-1 (with using 2T and 1.5 wt % of ZnCl$_2$) | Example 2-2 (with using 2T and 2.5 wt % of ZnCl$_2$) |
|---|---|---|---|
| PRB | 32.7% | 33.2% | 32.0% |
| EXP | 32.8% | 33.3% | 33.0% |
| POB | 25.1% | 30.2% | 32.3% |

TABLE 4

| Maintenance rate of PCE | C.E. 4 (using 2T) | Example 2-1 (with using 2T and 1.5 wt % of ZnCl$_2$) | Example 2-2 (with using 2T and 2.5 wt % of ZnCl$_2$) |
|---|---|---|---|
| PRB | 100.0% | 100.0% | 100.0% |
| EXP | 100.3% | 100.3% | 103.1% |
| POB | 76.8% | 91.0% | 100.9% |

The foregoing results confirm that the composite of the Examples may exhibit improved maintenance rate of the PCE after the FOB in comparison with the composites of Comparison Example.

Examples 3-1 and 3-2 and Comparative Example 5

A composition and a quantum dot polymer composite are prepared in the same manner as in Example 1 except for using red light emitting quantum dots and changing the amount of the ZnCl$_2$ into 0.7 wt % (based on the solid content, Example 3-1), 1.5 wt % (based on the solid content, Example 3-2), and 0 wt % (Comparative Example 5), respectively.

Figure 6:
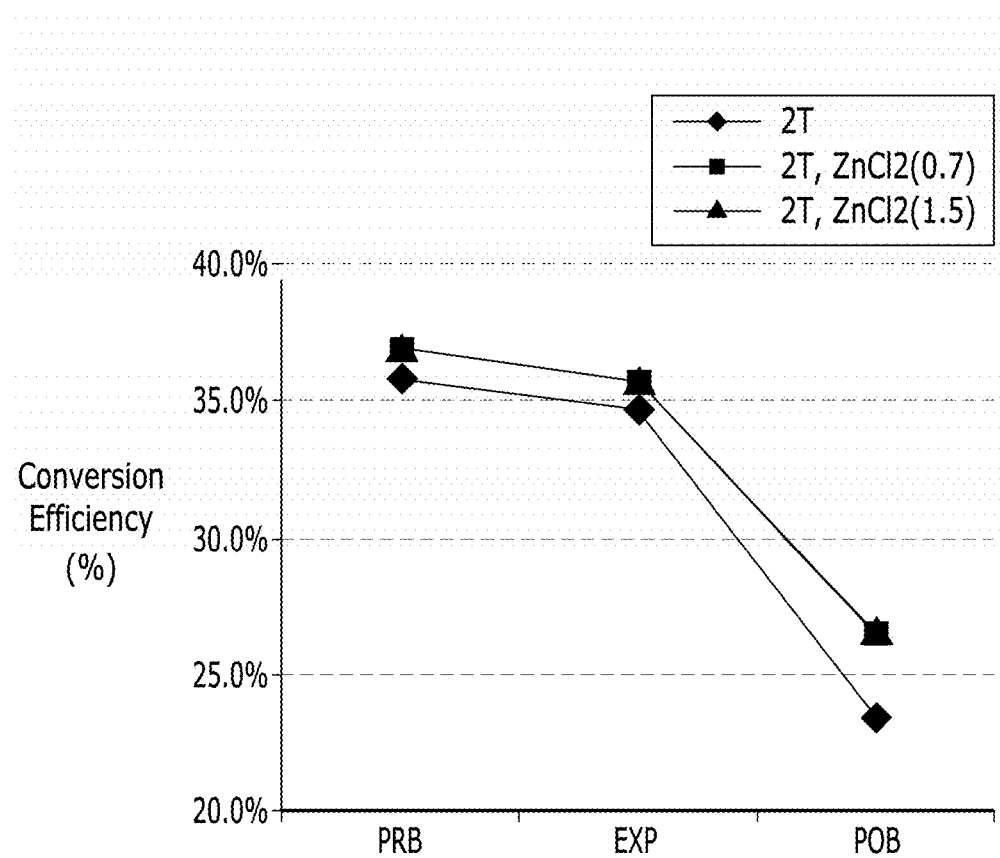
FIG. 6 is a graph showing a change in a photoconversion efficiency over the processes for preparing each of the composites in Example 3 and Comparative Example.

The photoconversion efficiency at the PRB, the EXP and the FOB are measured respectively, and the results are shown in Table 5 and FIG. 6.

Figure 7:
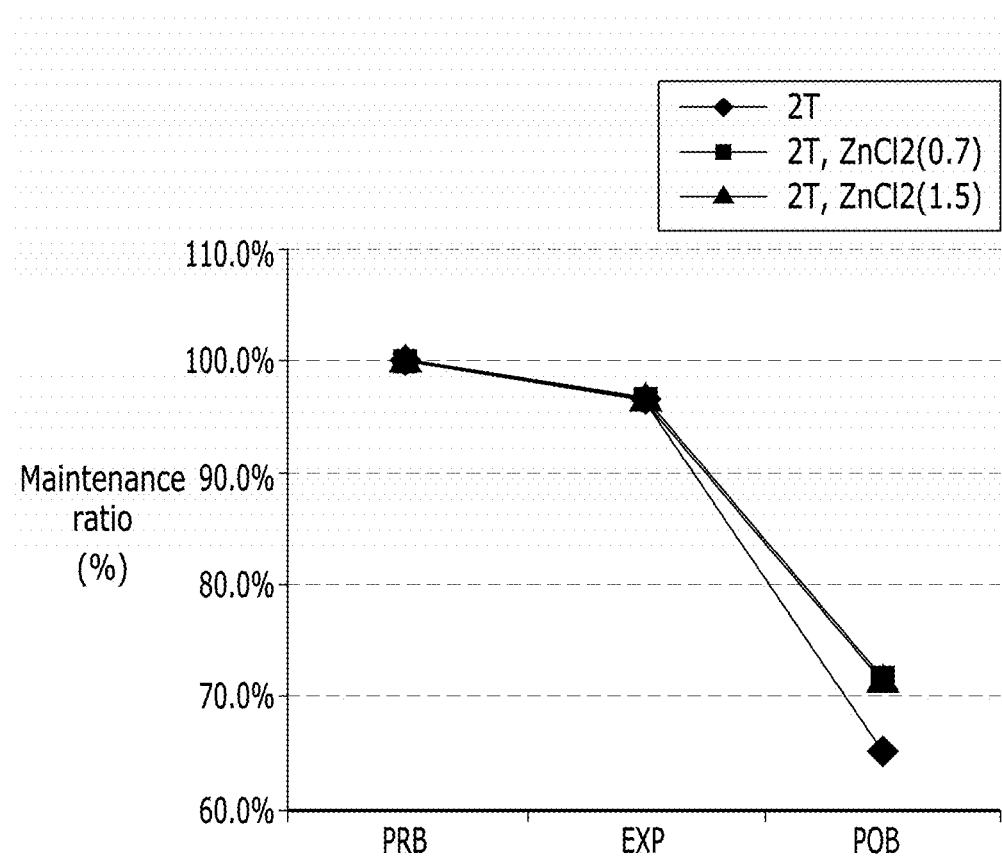
FIG. 7 is a graph of a maintenance rate of the photoconversion efficiency over the process of preparing each of the composites in Example 3 and Comparative Example.

Using the data of Table 5 and FIG. 6, the maintenance rate of the photoconversion efficiency is calculated, and the results are compiled in Table 6 and FIG. 7.

TABLE 5

| Photoconversion Efficiency (PCE) | C.E. 5 (using 2T) | Example 3-1 (with using 2T and 0.7 wt % of ZnCl$_2$) | Example 3-2 (with using 2T and 1.5 wt % of ZnCl$_2$) |
|---|---|---|---|
| PRB | 35.9% | 36.9% | 36.9% |
| EXP | 34.7% | 35.6% | 35.8% |
| POB | 23.4% | 26.4% | 26.4% |

TABLE 6

| Maintenance rate of PCE | C.E. 5 (using 2T) | Example 3-1 (with using 2T and 0.7 wt % of ZnCl$_2$) | Example 3-2 (with using 2T and 1.5 wt % of ZnCl$_2$) |
|---|---|---|---|
| PRB | 100.0% | 100.0% | 100.0% |
| EXP | 96.6% | 96.5% | 96.9% |
| POB | 65.2% | 71.6% | 71.5% |

The foregoing results confirm that the composite of the Examples may exhibit improved maintenance rate of the PCE after the FOB in comparison with the composites of Comparison Example.

Examples 4-1 and 4-2 and Comparative Example 6

A composition and a quantum dot polymer composite are prepared in the same manner as in Example 1 except for using green light emitting quantum dots and using 1.5 wt % of ZnCl$_2$ (based on the solid content, Example 4-1), 1.5 10 wt % of Et$_2$Zn (based on the solid content, Example 4-2), 1.5 wt % of InCl$_3$ (based on the solid content, Example 4-3), and no polyvalent metal compound (Comparative Example 6) respectively.

Figure 8:
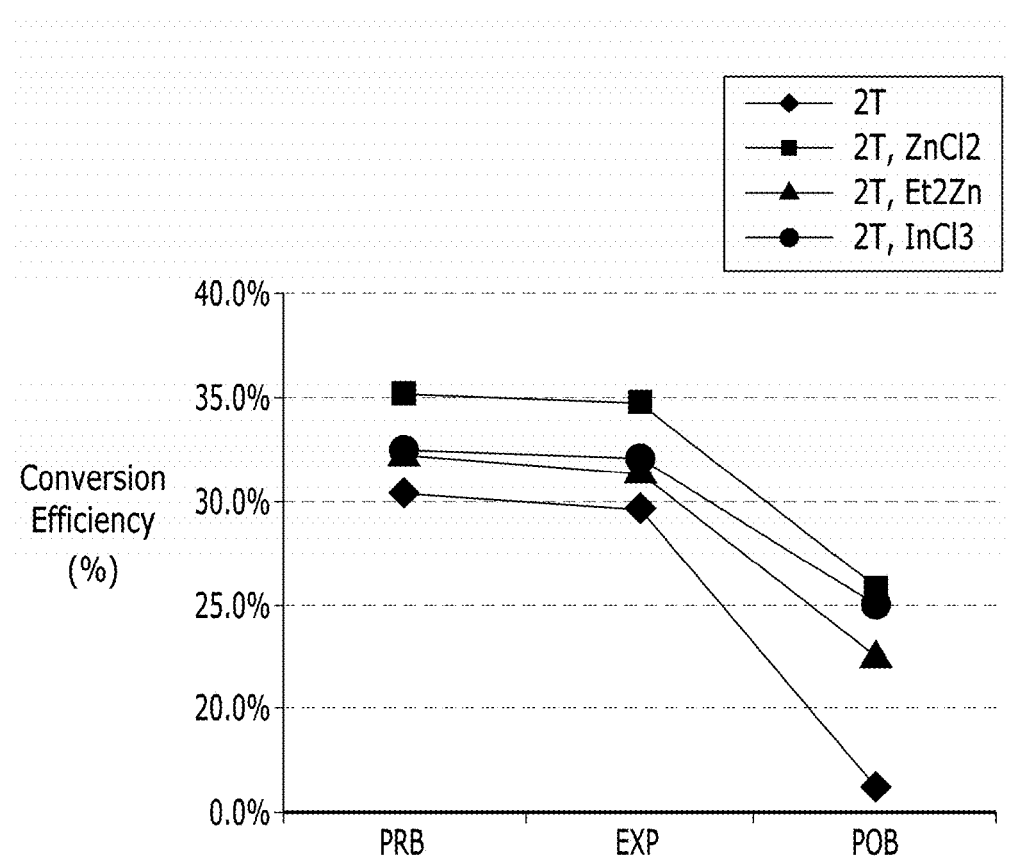
FIG. 8 is a graph showing a change in a photoconversion efficiency over the processes for preparing each of the composites in Example 4 and Comparative Example.

The photoconversion efficiency at the PRB, the EXP and the FOB are measured respectively, and the results are shown in Table 7 and FIG. 8.

Figure 9:
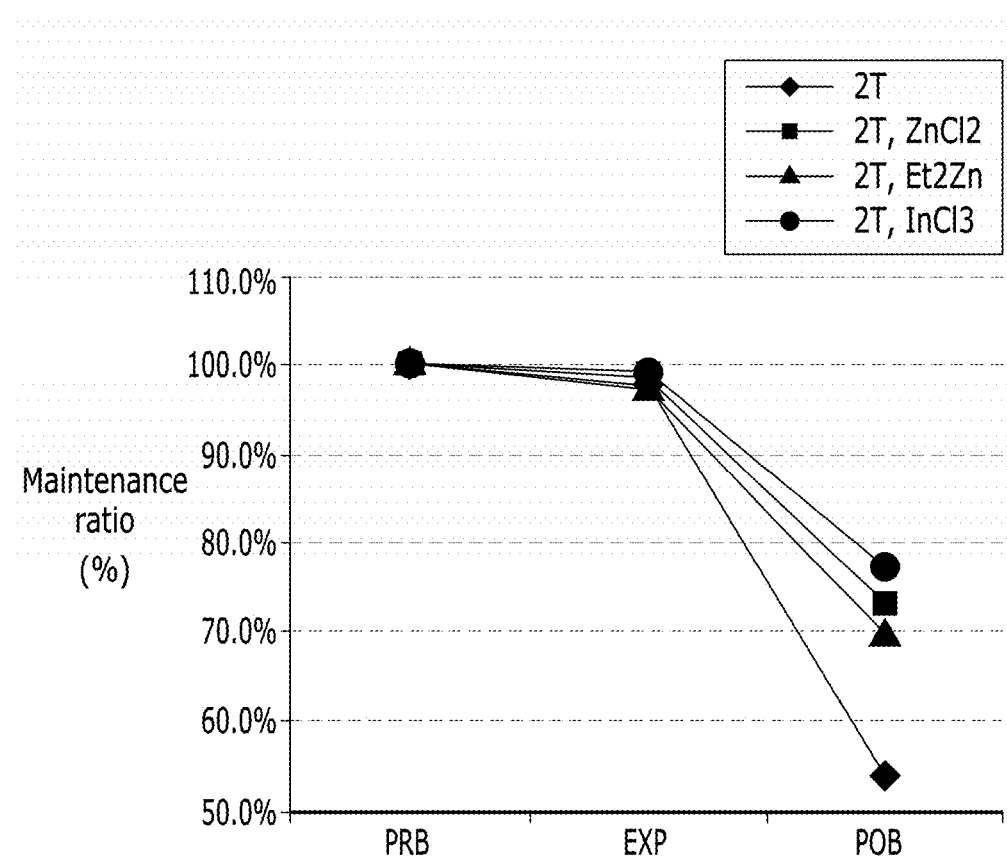
FIG. 9 is a graph of a maintenance rate of the photoconversion efficiency over the process of preparing each of the composites in Example 4 and Comparative Example.

Using the data of Table 5 and FIG. 6, the maintenance rate of the photoconversion efficiency is calculated, and the results are compiled in Table 8 and FIG. 9.

TABLE 7

| Photoconversion Efficiency (PCE) | C.E 6 (using 2T and no polyvalent metal compound) | Example 4-1 Using 2T, ZnCl$_2$ | Example 4-2 Using 2T, Et$_2$Zn | Example 4-3 Using 2T, InCl$_3$ |
|---|---|---|---|---|
| PRB | 30.3% | 35.2% | 32.3% | 32.4% |
| EXP | 29.6% | 34.7% | 31.4% | 32.1% |
| POB | 16.3% | 25.8% | 22.6% | 25.1% |

TABLE 8

| Maintenance rate of PCE | C.E 6 (using 2T and no polyvalent metal compound) | Example 4-1 Using 2T, ZnCl$_2$ | Example 4-2 Using 2T, Et$_2$Zn | Example 4-3 Using 2T, InCl$_3$ |
|---|---|---|---|---|
| PRB | 100.0% | 100.0% | 100.0% | 100.0% |
| EXP | 97.7% | 98.6% | 97.2% | 99.1% |
| POB | 53.8% | 73.3% | 70.0% | 77.5% |

The foregoing results confirm that the composite of the Examples may exhibit improved maintenance rate of the PCE after the FOB in comparison with the composites of Comparison Example.

Experimental Example 1

A composition is prepared in the same manner as in Example 1 except for using the components set forth in Table 9 and Table 10. The prepared composition is left at room temperature for one hour, and whether the curing phenomenon occurs for each of the compositions is observed. The results are compiled in Table 9 and Table 10.

TABLE 9

| Composition | Occurrence of Curing phenomenon |
|---|---|
| QD chloroform dispersion | X |
| QD chloroform dispersion + binder polymer + PR | X |
| QD chloroform dispersion + a mixed solution of binder polymer and ZnCl$_2$ + PR | O |
| QD chloroform dispersion + binder polymer | X |
| QD chloroform dispersion + a mixed solution of binder polymer and ZnCl$_2$ | X |
| binder polymer & ZnCl$_2$ + PR | X |

TABLE 10

| Composition | Occurrence of Curing phenomenon |
|---|---|
| QD chloroform dispersion + a mixed solution of binder polymer and ZnCl$_2$ + thiol compound (2T) | O |
| QD chloroform dispersion + a mixed solution of binder polymer and ZnCl$_2$ + M | X |
| QD chloroform dispersion a mixed solution of binder polymer and ZnCl$_2$ + initiator | X |
| QD chloroform dispersion + ZnCl$_2$ + 2T (no binder) | O |
| QD chloroform dispersion + ZnCl$_2$ | X |
| QD chloroform dispersion + thiol compound 2T | X |

In Table 9 and Table 10, "PR" refers to a mixture of the photopolymerizable monomer and the photoinitiator that are used in Example 1, "M" refers to a photopolymerizable monomer (hexaacrylate) used in Example 1, "initiator" refers to the photoinitiator.

The results of Table 9 and Table 10 indicate that mixing the quantum dots, zinc chloride, and the thiol compound result in the linkage between the quantum dots and the thiol compound.

Experimental Example 2

Figure 10:
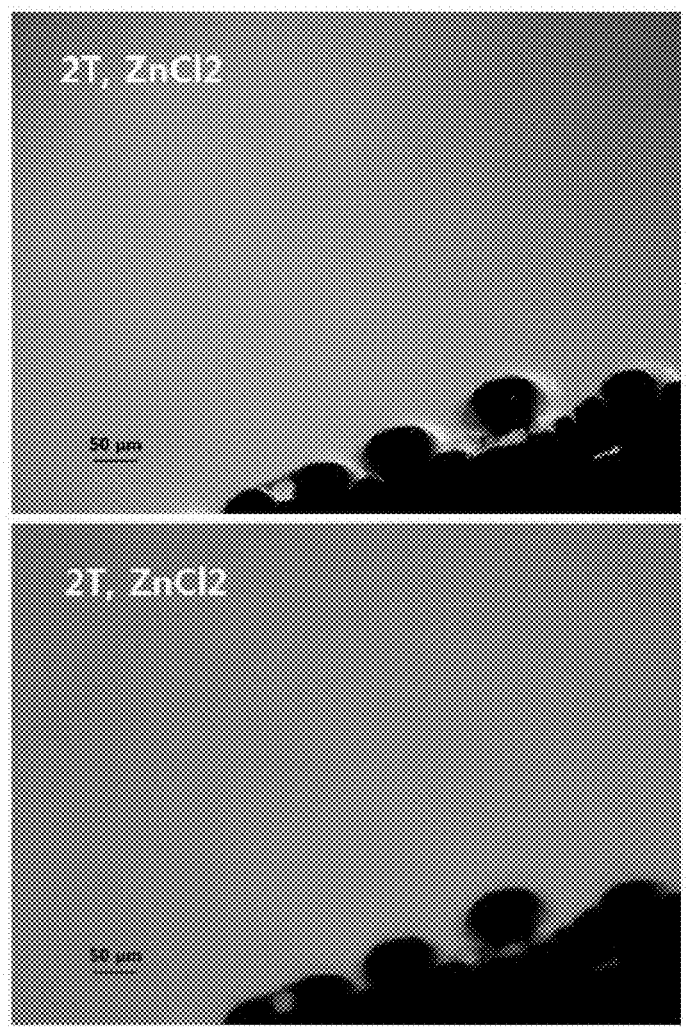
FIG. 10 displays images showing the results of Experimental Example 1 (the DF and FL microscopic analysis for a surface of the composite containing the polymer binder)

The surface of the composite prepared in Example 1 is observed by a Dark Field microscopy and a Fluorescence microscopy. The results are shown in FIG. 10. A composite is prepared in the same manner as in Example 1 except for not using the binder polymer. The surface of the composite, thus prepared, is observed by a Dark Field microscopy and a Fluorescence microscopy. The results are shown in FIG. 11.

Figure 11:
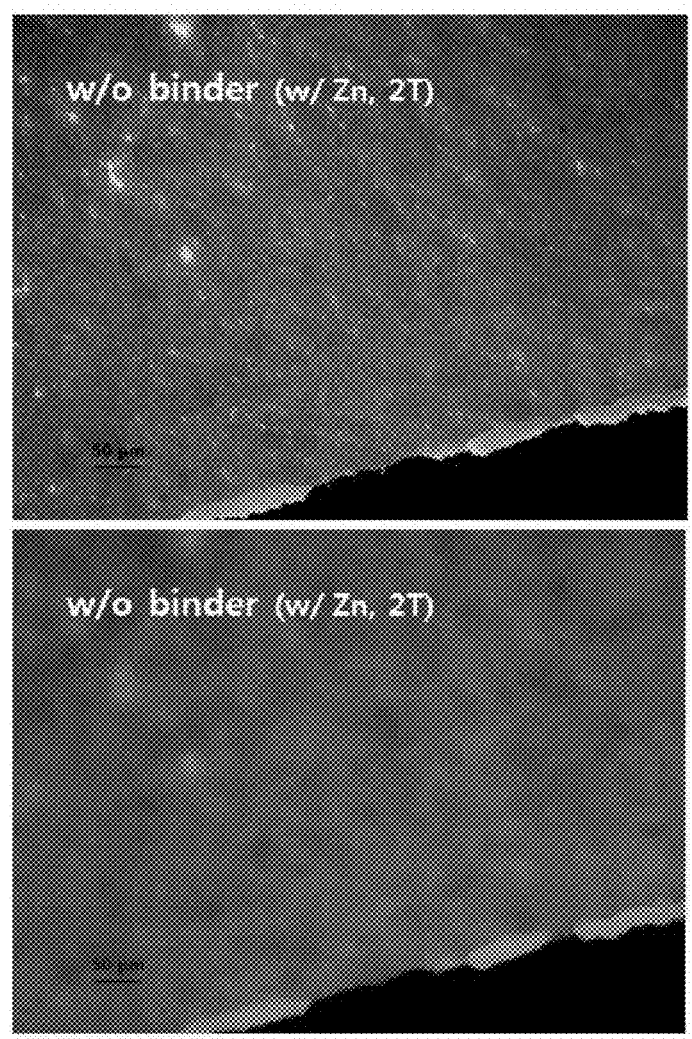
FIG. 11 displays images showing the results of Experimental Example 1 (the DF and FL microscopic analysis for a surface of the composite without the polymer binder)

Results of FIG. 10 and FIG. 11 confirm that the composite of Example 1 has a smooth surface and does not include any substantial agglomeration of the quantum dots in the composite, while the composite prepared without using the binder polymer has a bumpy surface and includes a significant agglomeration of the quantum dots. The composite prepared without using the binder polymer show non-uniform emission of light.

Experimental Example 3

For the composition and the composite of Example 1 and the composition and the composite of Comparative Example 3, the infra-red spectroscopic analysis at room temperature and after the FOB. The results are shown in FIG. 12.

For the composition and the composite of Example 1 and the composition and the composite of Comparative Example 3, the infra-red spectroscopic analysis after the PRB and after the FOB. The results are shown in FIG. 13.

Figure 12:
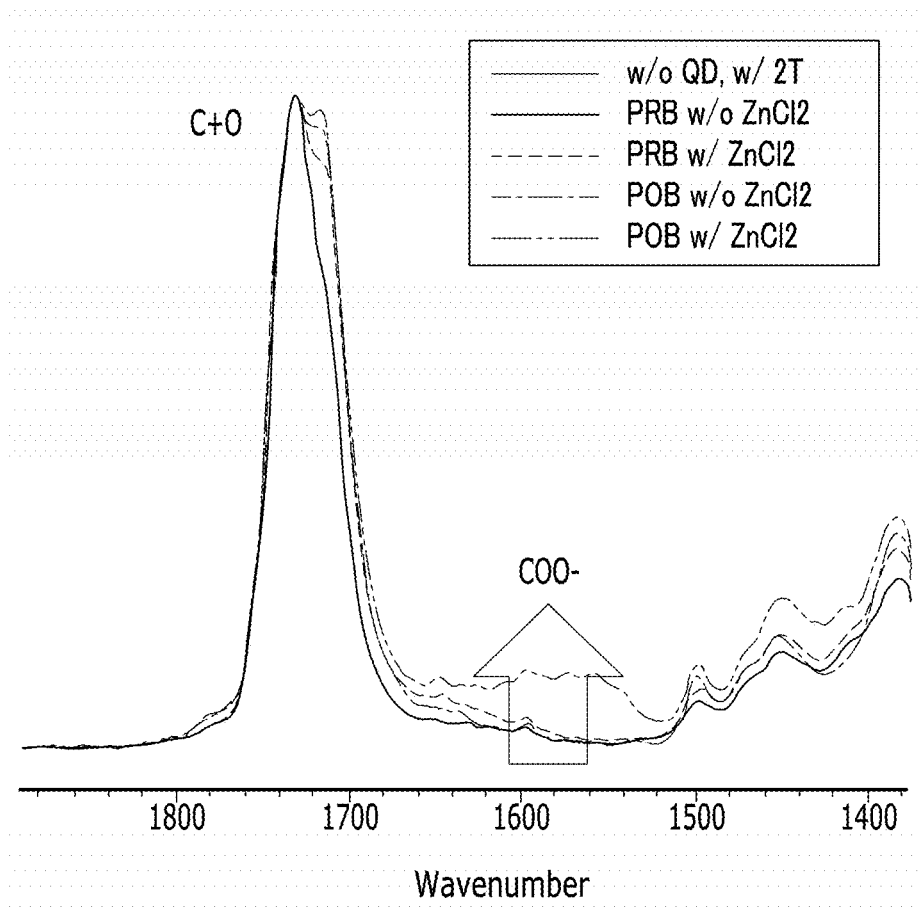
FIG. 12 is a graph of intensity (arbitrary units, a.u.) versus wavenumber (reverse centimeters, $cm^{-1}$) showing the results of Experimental Example 2 (the infrared spectroscopic analysis after the PRB and after the POB)
Figure 13:
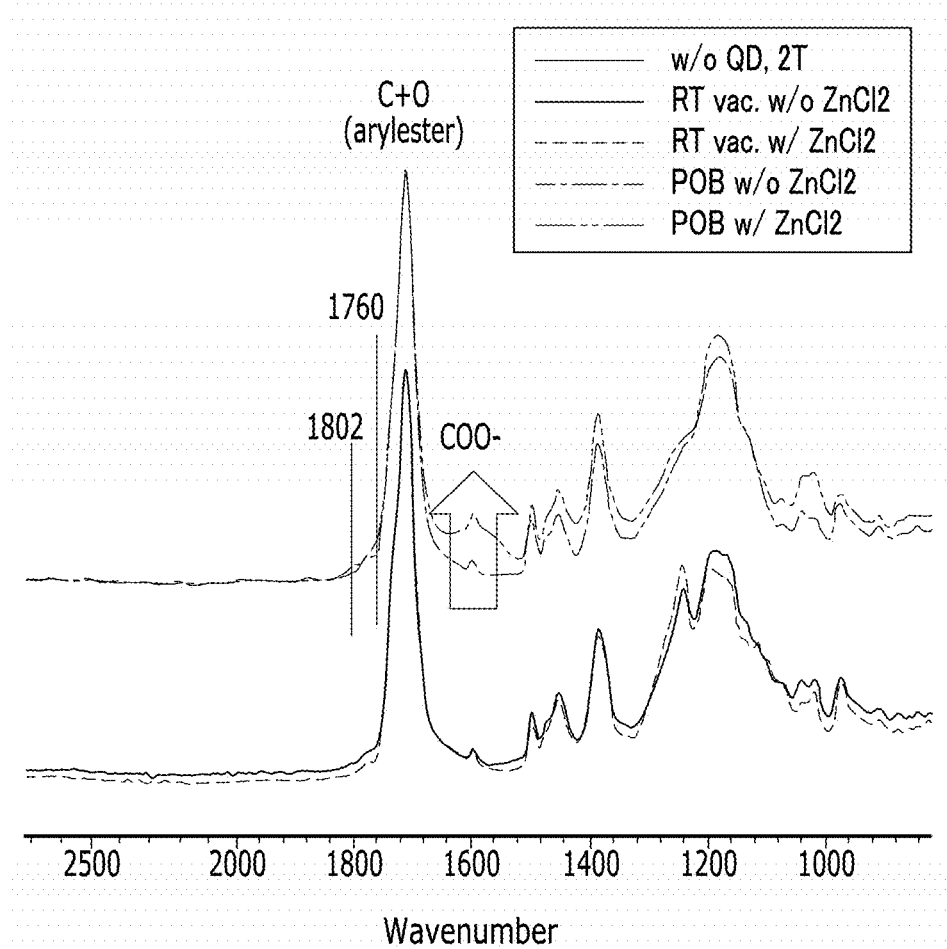
FIG. 13 are images showing the results of Experimental Example 2 (the infrared spectroscopic analysis at room temperature and after the FOB)

The results of FIG. 12 and FIG. 13 confirm that when the composite including the polyvalent metal compound (i.e., the zinc chloride) is heated to 180° C., the IR spectrum of the resulting composite has a carboxylate (COO—) peak. Such results indicate that the composite of Examples include an ionic crosslinking between the carboxylic acid moiety of the binder polymer and the metal ion (Zn$^{2+}$) of the zinc chloride.

Experimental Example 4

The absolute quantum yield of the composite of Example 1 is measured. The results are shown in Table 11 and FIG. 14.

The absolute quantum yield of the composite of Comparative Example 2 is measured. The results are shown in Table 11 and FIG. 14.

TABLE 11

| Abs. QY | Comparative Example 2 including 2T | Example 1 including 2T and ZnCl$_2$ |
|---|---|---|
| PRB | 68.3% | 68.8% |
| EXP | 67.7% | 69.5% |
| POB | 54.4% | 69.0% |

Figure 14:
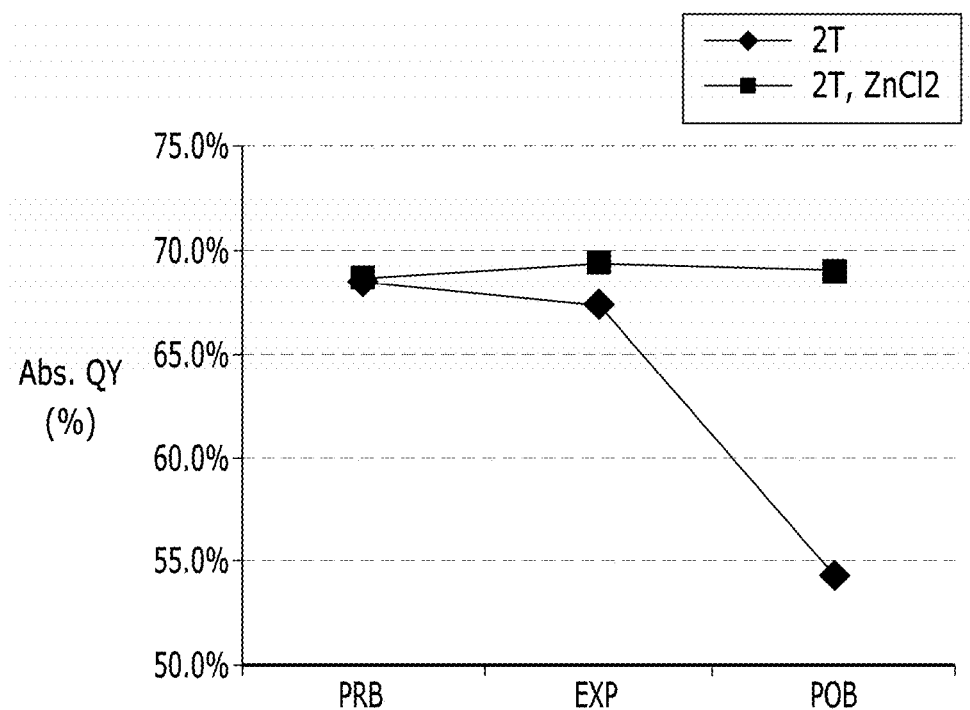
FIG. 14 is a graph showing a change in the absolute quantum yield over the processes of preparing each of the composites in Example 1 and Comparative Example.

The results of Table 11 and FIG. 14 confirm that the composite of Example 1 shows improved absolute quantum yield in comparison with the composite of Comparative Example.

Experimental Example 5

[1] A chloroform dispersion of red light emitting quantum dots including oleic acid as a hydrophobic organic ligand bonded to a surface thereof is prepared.

The chloroform dispersion is mixed with the binder polymer solution used in Example 1 to prepare a quantum dot binder dispersion. To the quantum dot binder dispersion, the thiol compound, the hexaacrylate, the photoinitiator, the light diffusing agent, and the PGMEA used in Example 1 to obtain a composition.

Figure 15:
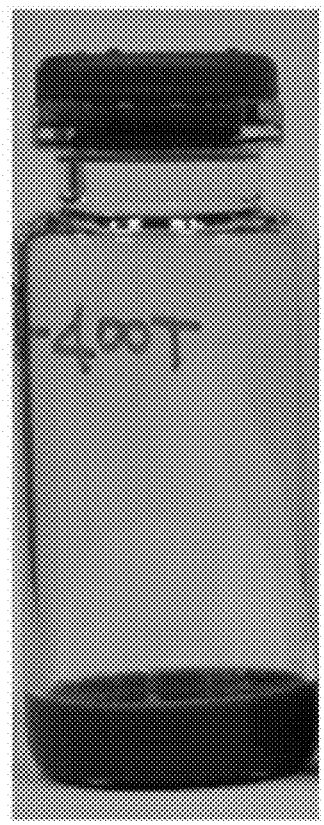
FIG. 15 and FIG. 16 show the results of Experimental Example 4.

The photographic image of the prepared composition is shown in FIG. 15, which confirms that the composition forms a dispersion without agglomeration caused by the addition of the quantum dots.

[2] To the binder polymer solution used in Example 1, the thiol compound, the hexaacrylate, the photoinitiator, the light diffusing agent, and the PGMEA used in Example 1 are added and mixed. To the resulting mixture, the quantum dot chloroform dispersion prepared in item [1] are mixed to form a composition. The photographic image of the prepared composition is shown in FIG. 16.

Figure 16:
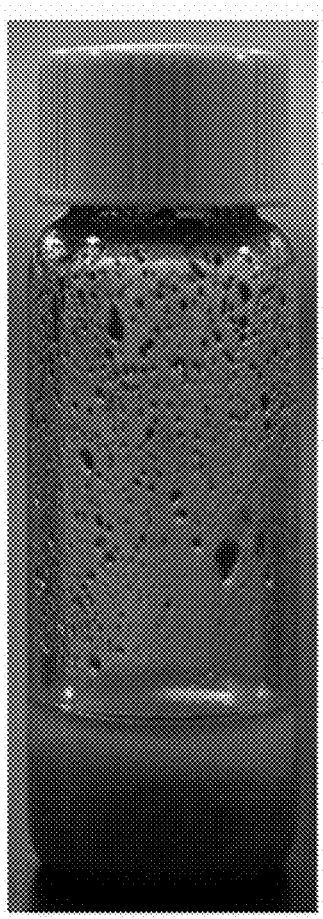

The results of FIG. 15 and FIG. 16 confirm that the composition including the quantum dot—binder dispersion and the remaining components may keep the uniform dispersibility, wherein the dispersed phase cannot be noticed with naked eye. In contrast, the composition prepared without forming the quantum dot binder dispersion cannot have the uniform dispersibility.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A quantum dot-polymer composite comprising a polymer matrix and a plurality of quantum dots dispersed in the polymer matrix, wherein the polymer matrix comprises a polymer comprising a carboxylate moiety (—COO—) and a carboxylic acid (—COOH) moiety, a polymerization product, a thiol compound or a moiety derived from the thiol compound, and a polyvalent metal compound;
wherein the polymerization product comprises a polymerization product of a photopolymerizable monomer comprising a carbon-carbon double bond, a polymerization product of the photopolymerizable monomer and a polythiol compound comprising at least two thiol groups, or a combination thereof,
wherein the polymer comprises:
a copolymer of a monomer combination comprising a first monomer comprising a carboxylic acid group (—COOH) and a carbon-carbon double bond, a second monomer comprising a carbon-carbon double bond and a hydrophobic moiety and not comprising a carboxylic acid group, and optionally, a third monomer comprising a carbon-carbon double bond and a hydrophilic moiety and not comprising a carboxylic acid group;
a multiple aromatic ring-containing polymer comprising a backbone structure comprising a carboxylic acid group (—COOH) and a main chain comprising a backbone structure incorporated in the main chain, wherein the backbone structure comprises a quaternary carbon atom, which is a part of a cyclic group, and two aromatic rings bound to the quaternary carbon atom; or
a combination thereof, and
wherein the copolymer comprises a first repeating unit derived from the first monomer a second repeating unit derived from the second monomer, and optionally a third repeating unit derived from the third monomer,
wherein the first repeating unit comprises a repeating unit represented by Chemical Formula 1-1, a repeating unit represented by Chemical Formula 1-2, or a combination thereof:

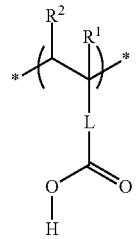

Chemical Formula 1-1 wherein,
$R^1$ is hydrogen, a C1 to C3 alkyl group, or —$(CH_2)_n$—COOH (wherein n is 0 to 2),
$R^2$ is hydrogen, a C1 to C3 alkyl group, or —COOH,
L is a single bond, a C1 to C15 aliphatic hydrocarbon group, a C6 to C30 aromatic hydrocarbon group, a C3 to C30 alicyclic hydrocarbon group, or a C1 to C15 aliphatic hydrocarbon group substituted with a C6 to C30 aromatic hydrocarbon group or a C3 to C30 alicyclic hydrocarbon group, and
* indicates a portion linked to an adjacent atom;

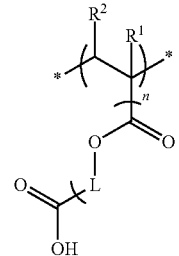

Chemical Formula 1-2 wherein
$R^1$ is hydrogen, a C1 to C3 alkyl group, or —$(CH_2)_{n1}$—COOH (wherein n1 is 0 to 2),
$R^2$ is hydrogen or a C1 to C3 alkyl group,
L is a C1 to C15 alkylene group, a C1 to C15 alkylene group wherein at least one methylene group is replaced with —C(=O)—, —O—, or —C(=O)O—, a C6 to C30 aromatic hydrocarbon group, a C3 to C30 alicyclic hydrocarbon group, or a C1 to C15 aliphatic hydrocarbon group substituted with a C6 to C30 aromatic hydrocarbon group or a C3 to C30 alicyclic hydrocarbon group,
n is an integer of 1 to 3, and
* indicates a portion linked to an adjacent atom;
wherein the second repeating unit comprises a repeating unit represented by Chemical Formula 2-1, a repeating unit represented by Chemical Formula 2-2, a repeating unit represented by Chemical Formula 2-3, a repeating unit represented by Chemical Formula 2-4, or a combination thereof:

Chemical Formula 2-1

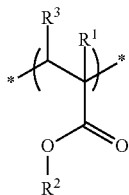

wherein
$R^1$ is hydrogen or a C1 to C3 alkyl group,
$R^2$ is a C1 to C15 aliphatic hydrocarbon group, a C6 to C30 aromatic hydrocarbon group, a C3 to C30 alicyclic hydrocarbon group, or a C1 to C15 aliphatic hydrocarbon group substituted with a C6 to C30 aromatic hydrocarbon group or a C3 to C30 alicyclic hydrocarbon group,
$R^3$ is hydrogen or a C1 to C3 alkyl group,
* indicates a portion linked to an adjacent atom;

Chemical Formula 2-2

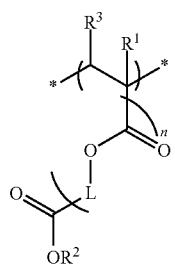

wherein
$R^1$ is hydrogen or a C1 to C3 alkyl group,
L is a C1 to C15 alkylene group, a C1 to C15 alkylene group wherein at least one methylene group is replaced with —C(=O)—, —O—, or —C(=O)O—, a C6 to C30 aromatic hydrocarbon group, a C3 to C30 alicyclic hydrocarbon group, or a C1 to C15 aliphatic hydrocarbon group substituted with a C6 to C30 aromatic hydrocarbon group or a C3 to C30 alicyclic hydrocarbon group,
$R^2$ is a C1 to C15 aliphatic hydrocarbon group, a C6 to C30 aromatic hydrocarbon group, a C3 to C30 alicyclic hydrocarbon group, or a C1 to C15 aliphatic hydrocarbon group substituted with a C6 to C30 aromatic hydrocarbon group or a C3 to C30 alicyclic hydrocarbon group,
$R^3$ is hydrogen or a C1 to C3 alkyl group,
n is an integer of 1 to 3, and
* indicates a portion linked to an adjacent atom;

Chemical Formula 2-3

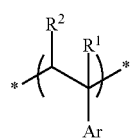

wherein
each of $R^1$ and $R^2$ is independently hydrogen or a C1 to C3 alkyl group,
Ar is a substituted or unsubstituted C6 to C30 aromatic hydrocarbon group or a substituted or unsubstituted C3 to C30 alicyclic hydrocarbon group, and
* indicates a portion linked to an adjacent atom;

Chemical Formula 2-4

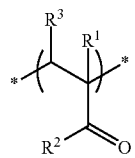

wherein
$R^1$ is hydrogen or a C1 to C3 alkyl group,
$R^2$ is a C1 to C15 aliphatic hydrocarbon group, a C6 to C30 aromatic hydrocarbon group, a C3 to C30 alicyclic hydrocarbon group, or a C1 to C15 aliphatic hydrocarbon group substituted with a C6 to C30 aromatic hydrocarbon group or a C3 to C30 alicyclic hydrocarbon group,
$R^3$ is hydrogen or a C1 to C3 alkyl group, and
* indicates a portion linked to an adjacent atom;
wherein the third repeating unit is represented by Chemical Formula 3:

Chemical Formula 3

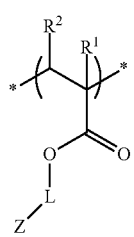

wherein
each of $R^1$ and $R^2$ is independently hydrogen or a C1 to C3 alkyl group,
L is a C1 to C15 alkylene group, a C1 to C15 alkylene group wherein at least one methylene group is replaced with —C(=O)—, —O—, or —C(=O)O—, a C6 to C30 aromatic hydrocarbon group, a C3 to C30 alicyclic hydrocarbon group, or a C1 to C15 aliphatic hydrocarbon group substituted with a C6 to C30 aromatic hydrocarbon group or a C3 to C30 alicyclic hydrocarbon group,
Z is a hydroxyl group (—OH), a mercapto group (—SH), or an amino group (—NHR, wherein R is hydrogen or a C1 to C5 alkyl group), and
* indicates a portion linked to an adjacent atom.

2. The quantum dot-polymer composite of claim 1, wherein the moiety derived from the thiol compound binds at least two quantum dots of the plurality of quantum dots to each other.

3. The quantum dot-polymer composite of claim 1, wherein the quantum dots comprise an organic ligand on a surface thereof, and wherein the organic ligand comprises RCOOH, $RNH_2$, $R_2NH$, $R_3N$, RSH, $R_3PO$, $R_3P$, ROH, RCOOR', $RPO(OH)_2$, $R_2POOH$ (wherein R and R' are each independently a C5 to C24 aliphatic hydrocarbon group or a C6 to C20 aromatic hydrocarbon group), a polymeric organic ligand, or a combination thereof.

4. The quantum dot-polymer composite of claim 1, wherein the quantum dots comprise a Group II-VI compound, a Group III-V compound, a Group IV-VI compound, a Group IV element or compound, a Group I-III-VI compound, a Group I-II-IV-VI compound, or a combination thereof.

5. The quantum dot-polymer composite of claim 1, wherein the polymer has an acid value of greater than about 50 milligrams of KOH per gram of the polymer and less than or equal to about 250 milligrams of KOH per gram of the polymer.

6. The quantum dot-polymer composite of claim 1, wherein the backbone structure of the multiple aromatic ring-containing polymer comprises a unit represented by Chemical Formula B:

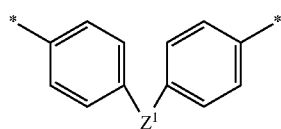

Chemical Formula B wherein
* indicates a portion that is linked to an adjacent atom of the main chain of the multiple aromatic ring-containing polymer,
$Z^1$ is a linking moiety represented by any one of Chemical Formulae B-1 to B-6, and in Chemical Formulae B-1 to B-6, * indicates a portion that is linked to an adjacent atom:

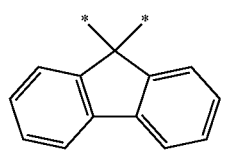

Chemical Formula B-1

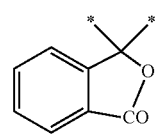

Chemical Formula B-2

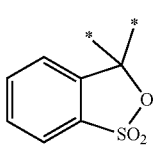

Chemical Formula B-3

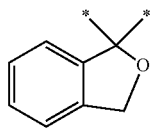

Chemical Formula B-4

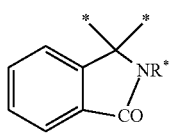

Chemical Formula B-5 wherein IV is hydrogen, an ethyl group, $C_2H_4Cl$, $C_2H_4OH$, $CH_2CH\!=\!CH_2$, or a phenyl group,

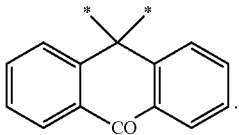

Chemical Formula B-6

7. The quantum dot-polymer composite of claim 1, wherein the polyvalent metal compound comprises a metal selected from Mg, Ca, Sc, Ti, V, Cr, Mn, Fe, Co, Ni, Cu, Zn, Ga, Sr, Y, Zr, Nb, Mo, Cd, In, Ba, Au, Hg, Tl, or a combination thereof.

8. The quantum dot-polymer composite of claim 1, wherein the polyvalent metal compound comprises an organic metal compound, an organic salt, an inorganic salt, or a combination thereof.

9. The quantum dot-polymer composite of claim 1, wherein the polyvalent metal compound comprises a metal chloride, an alkylated metal, a metal acetate, a metal (meth) acrylate, a metal dialkyldithiocarbamate, or a combination thereof.

10. The quantum dot-polymer composite of claim 1, wherein the thiol compound binds at least two quantum dots of the plurality of quantum dots to each other, or
wherein the polymer matrix comprises an ionic crosslinking bond between the carboxylate moiety and a metal ion of the polyvalent metal compound.

11. The quantum dot-polymer composite of claim 1, wherein the quantum dot-polymer composite comprises, based on a total weight of the composite:
about 1 weight percent to about 70 weight percent of the quantum dots;
about 0.5 weight percent to about 70 weight percent of the polymer;
about 0.5 weight percent to about 75 weight percent of the polymerization product;
about 0.1 weight percent to about 55 weight percent of the thiol compound; and
about 0.01 weight percent to about 10 weight percent of the polyvalent metal compound.

12. The quantum dot-polymer composite of claim 1, wherein the quantum dot polymer composite has an absolute quantum yield of greater than or equal to about 60%.

13. The quantum dot-polymer composite of claim 1, wherein the quantum dot-polymer composite further comprises a light diffusing agent and in the quantum dot-polymer composite, an amount of the quantum dots is from about 12 wt % to about 55 wt %, and an amount of the light diffusing agent is greater than or equal to about 3 wt % and less than or equal to about 25 w %, based on a total weight of the composite.

14. The quantum dot-polymer composite of claim 1, wherein the quantum dot-polymer composite is in a form of a pattern, and the pattern comprises a first repeating section and a second repeating section.

15. The quantum dot-polymer composite of claim 14, wherein the first repeating section comprises red light emitting quantum dots and is configured to emit red light and the second repeating section comprises green light emitting quantum dots and is configured to emit green light.

16. The quantum dot-polymer composite of claim 1, wherein the quantum dot polymer composite further comprises a light diffusing agent in an amount of from about 0.1 wt % to about 25 wt %, based on a total weight of the composite.

17. A color filter comprising the quantum dot-polymer composite of claim 1, wherein the quantum dot-polymer composite is in a form of a pattern, and the pattern comprises a first repeating section and a second repeating section.

18. An electronic device comprising the quantum dot polymer composite of claim 1.

19. A display device comprising the quantum dot polymer composite of claim 1.

* * * * *